(12) United States Patent
Morisawa et al.

(10) Patent No.: US 7,048,671 B2
(45) Date of Patent: May 23, 2006

(54) CONTROL DEVICE AND METHOD FOR ENGINE AND TRANSMISSION

(75) Inventors: Kunio Morisawa, Toyota (JP); Toshinari Ogawa, Nagoya (JP); Naoki Moriguchi, Susono (JP); Tadashi Tamura, Nishikamo-gun (JP); Tadayuki Nagai, Toyota (JP); Makoto Ogiso, Mishima (JP); Keiji Yoeda, Numazu (JP); Hideyuki Nishida, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 10/489,345

(22) PCT Filed: Sep. 19, 2002

(86) PCT No.: PCT/IB02/03857

§ 371 (c)(1),
(2), (4) Date: Apr. 9, 2004

(87) PCT Pub. No.: WO03/024736

PCT Pub. Date: Mar. 27, 2003

(65) Prior Publication Data

US 2004/0214687 A1     Oct. 28, 2004

(30) Foreign Application Priority Data

Sep. 20, 2001    (JP) ............................. 2001-287728

(51) Int. Cl.
*B60K 41/04*    (2006.01)
*B60K 41/02*    (2006.01)

(52) U.S. Cl. ................... 477/109; 477/180; 477/181

(58) Field of Classification Search ................. 477/109, 477/110, 111, 180, 181
See application file for complete search history.

(56) References Cited

U.S. PATENT DOCUMENTS 4,715,330 A    12/1987    Buchl (Continued)

FOREIGN PATENT DOCUMENTS

EP            0 420 443 A1    4/1991

(Continued)

OTHER PUBLICATIONS

"The Gasoline Engines in the 21$^{st}$ Century, What Should They Be?," JSAE Symposium, No. 12-00, pp. 12-19, Dec. 13, 2000.

*Primary Examiner*—Roger Pang
(74) *Attorney, Agent, or Firm*—Oliff & Berridge, PLC

(57) ABSTRACT

The invention relates to a control device for an engine able to control at least one of an intake valve and an exhaust valve via a driving mechanism actuated without a torque from an output shaft of the engine, and a transmission connected to the engine. The control device includes a torque transmitting device for reducing the torque from the engine while that torque is being transmitted to an output shaft of the transmission, and control means for controlling the torque transmitting device so as to reduce the torque transmitted from the engine to the output shaft of the transmission during an upshift, controlling a engine speed to a target speed after shifting during the unshift, and controlling the torque transmitting device so as to increase the torque transmitted to the output shaft of the transmission after the engine speed is synchronized with the speed after shifting.

19 Claims, 19 Drawing Sheets

U.S. PATENT DOCUMENTS

| | | | |
|---|---|---|---|
| 5,405,303 A | 4/1995 | Takada et al. | |
| 5,425,284 A * | 6/1995 | Davis | 74/335 |
| 5,476,425 A * | 12/1995 | Shiraishi et al. | 477/109 |
| 5,508,916 A * | 4/1996 | Markyvech et al. | 477/120 |
| 5,583,766 A * | 12/1996 | Birchenough et al. | 477/109 |
| 5,655,407 A * | 8/1997 | Dresden et al. | 477/92 |
| 5,947,863 A | 9/1999 | Grob et al. | |
| 6,007,455 A * | 12/1999 | Steeby | 477/109 |
| 6,503,171 B1 * | 1/2003 | Böckmann et al. | 477/107 |
| 6,546,910 B1 | 4/2003 | Tanaka et al. | |
| 2001/0027760 A1 | 10/2001 | Tanaka et al. | |
| 2003/0130090 A1 | 7/2003 | Tanaka et al. | |

FOREIGN PATENT DOCUMENTS

| | | | | |
|---|---|---|---|---|
| EP | 0 562 561 A1 | 9/1993 | | |
| JP | A 2-294509 | 12/1990 | | |
| JP | A 3-367 | 1/1991 | | |
| JP | 403129165 A * | 6/1991 | | 477/109 |
| JP | A 4-303153 | 10/1992 | | |
| JP | A 6-26373 | 2/1994 | | |
| JP | A 7-139380 | 5/1995 | | |
| JP | A 11-117778 | 4/1999 | | |
| JP | A 2001-336432 | 12/2001 | | |
| WO | WO 00/37786 | 6/2000 | | |

\* cited by examiner

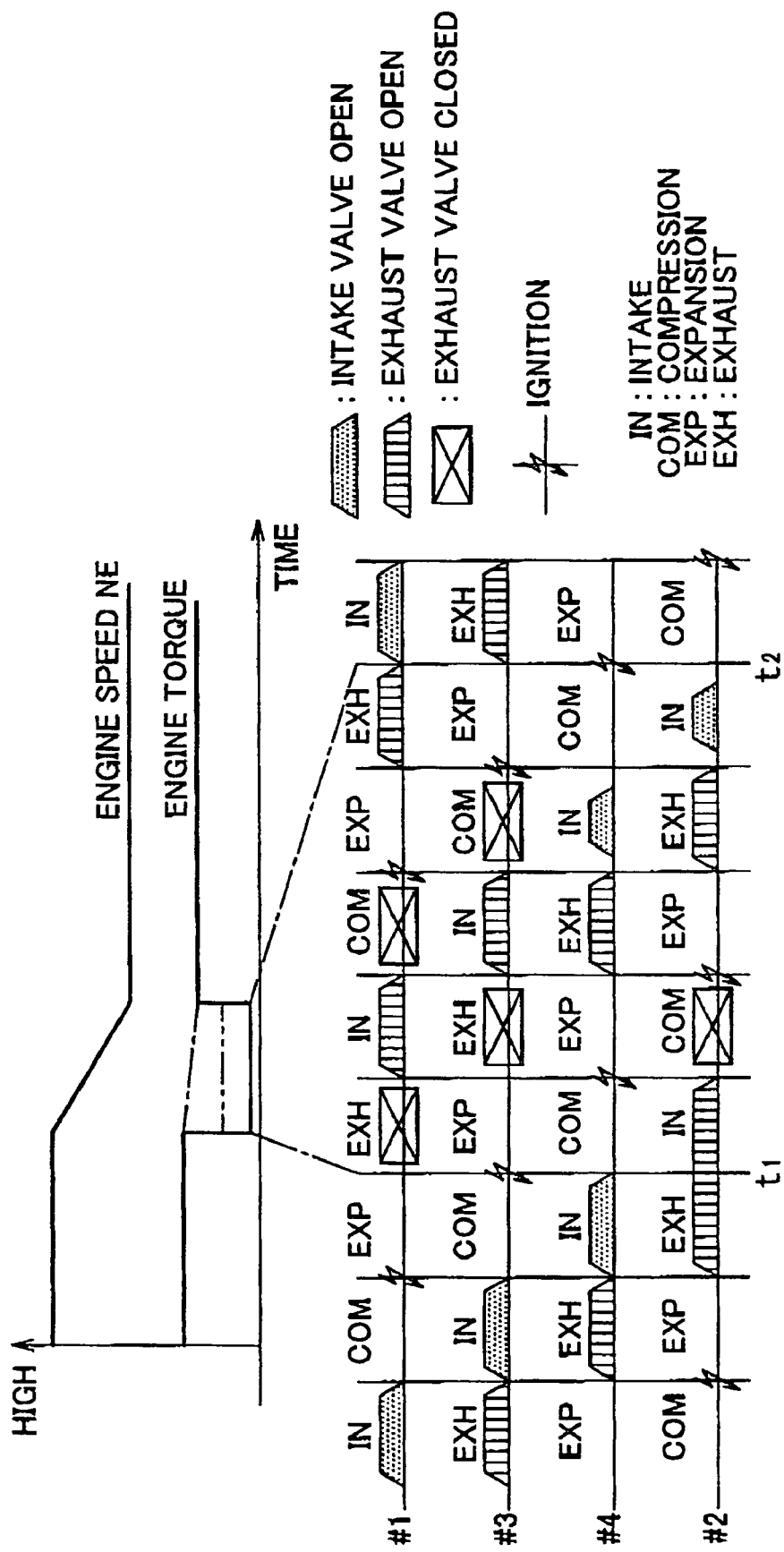

CONTROL DEVICE AND METHOD FOR ENGINE AND TRANSMISSION

FIELD OF THE INVENTION

The invention relates generally to a device and method for controlling both an engine, such as a gasoline engine, and a transmission connected to an output side of that engine. More specifically, the invention relates to a device and method for controlling both an engine able to be controlled by a driving mechanism such as an electromagnetic driving mechanism which operates at least one of an intake valve and an exhaust valve independent of a rotation of an engine output shaft, and either an automatic or manual transmission connected to that engine.

BACKGROUND OF THE INVENTION

The fact that output characteristics of an engine such as a gasoline engine change according to the state of the intake and exhaust is well known. Changing the timing and lift amount of the intake and exhaust valves according to the driving state of the vehicle in order to improve fuel efficiency or increase the torque in the low to mid speed range and the like is common practice. Control of the valve timing and lift amount has been done by various mechanisms for changing the cam phase with respect to the crank angle, or changing the cam itself, which drives the valves, or the like. Recently, however, a mechanism has been proposed for driving the valves using electromagnetic force in order to further improve the degree of freedom of control, as disclosed in Japanese Patent Laid-Open Publication No. 11-11778. Further, a valve mechanism for controlling valve opening and closing using hydraulic pressure (fluid pressure) is disclosed in Japanese Patent Laid-Open Publication No. 8-189315.

The control device disclosed in Japanese Patent Laid-Open Publication No. 11-11778, mentioned above, adjusts the braking force during deceleration such that smooth deceleration is achieved by adjusting negative torque generated by the engine in each cylinder. The negative torque is adjusted by shortening the opening time of either the intake valve or the exhaust valve during deceleration. That is, the control device finely controls the positive and negative torque of the engine by controlling the torque of each cylinder, and complements the control of the driving torque from the transmission.

However, positive or negative torque generated by the engine greatly affects the torque applied to the transmission. As a result, the shift characteristics of the transmission change depending on the torque generated by the engine. In spite of this engine torque control during shifting of the transmission is mainly performed by control to retard the ignition timing. In addition, the aforementioned publication goes only as far as to consider temporarily reducing engine torque by fuel cut control and throttle control. Engine torque control during shifting using the kind of electromagnetically driven valves disclosed in the aforementioned publication is not specifically considered.

Therefore, a preferable mode of control (a mode for so-called harmonized control) for controlling shifting in a transmission and controlling the engine torque using electromagnetically driven valves has not been known. Accordingly, there is still room for development regarding torque control of an engine having electromagnetically driven valves.

DISCLOSURE OF THE INVENTION

It is an object of this invention to provide a control device and a control method for controlling at least one of an intake valve and an exhaust valve so as to achieve an engine driving state that is advantageous for shift control of a transmission.

According to the invention, at least one of an intake valve and an exhaust valve is actuated by a separate driving mechanism provided for each intake and exhaust valve so as either to match the state of progression of a shift in a transmission or progress the shift of the transmission.

A first aspect of the invention relates to a control device for an engine able to control at least one of an intake valve and an exhaust valve via a driving mechanism actuated without a torque from an output shaft of the engine, and a transmission connected to the engine. The control device includes control means for performing intake air amount control to adjust the amount of air taken into the engine such that the difference in engine speed before and after shifting the transmission is absorbed by controlling at least one of the intake valve and the exhaust valve with the driving mechanism. The shift is an upshift in which a gear change ratio is reduced.

The intake air amount control includes reducing the engine speed from the engine speed before the shift to a target speed of the engine after the shift during the period of shifting.

During the inertia phase while shifting, an inertia torque generated by the shift may be absorbed by both the intake air amount control and clutch hydraulic pressure control on the transmission side. Also, all of the inertia torque may be absorbed by the intake air amount control.

In this way, during the inertia phase while shifting, if the inertia torque that should be originally transmitted to the transmission when the intake air amount control was not performed is absorbed by the intake air amount control, it is possible to reduce the amount of the inertia torque to be absorbed by the clutch hydraulic pressure control on the transmission side more than when the intake air amount control is not performed.

Accordingly, it is also possible to reduce or eliminate the control width of the clutch hydraulic pressure control that is necessary for absorbing the inertia torque in the inertia phase.

The control device includes a torque transmitting device that reduces the torque from the engine while that torque is being transmitted to the output shaft of the transmission, and control means for controlling the torque transmitting device so as to reduce the torque transmitted from the engine to the output shaft of the transmission during a shift of the transmission, controlling an engine speed to a target speed after shifting during the shift of the transmission, performing the intake air amount control during shifting of the transmission and controlling the torque transmitting device so as to increase the torque transmitted to the output shaft of the transmission after the engine speed is synchronized with the target speed after shifting by the intake air amount control.

If the torque transmitting device is a transmitting mechanism that connects the engine with the transmission, the control means performs for example the following control.

The control means reduces a torque capacity of the transmitting mechanism during shifting, executes the shift while the torque capacity of the transmitting mechanism is being reduced, controls the engine speed to the target speed in accordance with a gear change ratio after shifting by the intake air amount control while the torque which is transmitted from the engine to the transmission by the transmitting mechanism is being reduced, and increases the torque transmitted from the engine to the transmission by the transmitting mechanism after the engine speed is synchronized with the speed in accordance with the gear change ratio after shifting.

If the transmitting mechanism includes a clutch mechanism that can be controlled to an engaged state for transmitting torque and a released state for interrupting torque, the control means may selectively control the clutch mechanism to the released state and the engaged state.

If the transmitting mechanism includes a clutch mechanism which can transmit the torque following mutual sliding of torque transmitting members, increase and decrease degree of the mutual sliding, the control means may control the degree of the mutual sliding by the clutch mechanism and controls the clutch mechanism so that the torque is transmitted without sliding.

Therefore, with these control devices, the upshift of the transmission is executed while there is a drop or interruption in torque transmitted from the engine to the transmission. This suppresses a drop in engine speed following a reduction in the gear change ratio, or keeps the speed from changing. As a result, a sudden change in output shaft torque, as well as the shock that follows that sudden change, are minimized.

On the other hand, the engine speed is also reduced by the intake air amount control during this shift. When the engine speed is synchronized with the target speed after the upshift, a torque capacity of a transmitting mechanism is increased, and the engine and the transmission are firmly connected. Accordingly, the engine is controlled separately from the transmission and its speed is reduced while a variation in engine torque following the change in engine speed is suppressed from appearing as a variation in output shaft torque. Therefore, shock is able to be prevented or minimized without transient torque that follows the upshift affecting the driving torque. Also, at the same time, the engine itself is controlled so that its speed drops to the target speed after the upshift. This makes it possible to quickly change the engine speed. As a result, it is possible to shorten the shift time and therefore improve shift response.

In the first aspect of the invention, if the torque transmitting device includes an engaging device on a high gear speed side within the transmission, and the shift is executed while the torque from the engine is input to the transmission, the control means may also progress the upshift following an increase in an engaging force in the engaging device on the high gear speed side and correct a difference between the engine speed in accordance with an engaged state of the engaging device in an inertia phase during the upshift and the target speed after shifting by the intake air amount control.

Therefore, the upshift progresses following an increase in engaging force of an engaging device on the high gear speed side. During the inertia phase in which the speed of the rotating members, such as the engine speed, changes in the upshift process, the engine speed is changed by the intake air amount control so as to correct the difference between the engine speed and the target engine speed. That is, the output shaft torque is ensured by the engaging device gradually increasing the engaging force so that the upshift in which there is virtually no torque interruption is performed. Moreover, the engine speed during that time is changed not only by the engaging force of the engaging device, but also by the control of the engine itself. As a result, the torque capacity of the engaging device can be reduced because the majority or part of the torque necessary for changing the engine speed is not applied to the engaging device.

In the first aspect of the invention, if the torque transmitting device includes an engaging device on a high gear speed side within the transmission, and the shift is executed while the torque from the engine is input to the transmission, an engaging force of the engaging device may be set to a predetermined value at the time of the shift, and the engine speed may be controlled to the target speed after shifting by the intake air amount control.

Accordingly, in this kind of control device, the engaging force of the engaging device for establishing the high gear speed after upshifting is set to the predetermined value in accordance with a requested output amount or the like at that point. Therefore, a shift in which there is virtually no torque interruption is executed. At the time of that shift, it is necessary to have torque for changing the speed of the engine and the like. Therefore, it is not possible to quickly change the speed just by setting the engaging force of the engaging device on the high gear speed side to the predetermined value as described above. Because the engine speed is reduced by the intake air amount control, however, the engine speed following the upshift is changed by controlling the engine itself without relying on the transmission. As a result, the torque capacity of the engaging device can be reduced because the majority or part of the torque necessary for changing the engine speed is not applied to the engaging device.

In the first aspect of the invention, if the engine performs an intake stroke for drawing in air and an exhaust stroke for exhausting a combusted exhaust gas, the intake air amount control may include at least one of suppressing discharge of the combusted exhaust gas on the exhaust stroke so as to reduce the engine speed, and controlling at least one of the intake valve and the exhaust valve so as to draw in the combusted exhaust gas again on the intake stroke so as to reduce the engine speed.

Accordingly, it is possible to reduce the engine speed by using a torque loss that occurs from compressing the exhaust generated by combustion. In an engine having a plurality of cylinders, this control may be performed simultaneously in all of the cylinders, or in any one or some of the cylinders. Further, this control may be performed with either the same or different amounts of exhaust in each cylinder. Therefore, it is possible to rapidly and greatly decrease the engine speed and minimize deterioration of the exhaust gas, minimize an increase in load on an exhaust purification catalyst, and/or minimize a deterioration of fuel efficiency and the like.

In the first aspect of the invention, if the engine performs an intake stroke for drawing in air, the intake air amount control may include controlling the intake valve so as to increase an intake air quantity and increase the engine speed. The engine speed may also be increased by the intake air amount control to increase the intake air quantity.

Accordingly, when the engine speed is increased during upshifting the intake air quantity drawn in on the intake stroke is increased. In an engine having a plurality of cylinders, this control may be performed simultaneously in all of the cylinders, or may be performed in any one or some of the cylinders. Furthermore, the intake air quantity may be increased by lengthening the period in which the intake valve is open, or by increasing the intake valve lift or the like. Moreover, that intake air quantity may be made the same or different for each cylinder.

With this type of construction, it is possible to rapidly and greatly increase the engine speed.

In the first aspect of the invention, the driving mechanism may include an electromagnetic mechanism provided for each valve, for electromagnetically opening and closing the valves individually.

Accordingly, at least one of the intake valve and the exhaust valve can be electronically controlled, which both simplifies the control device and facilitates control.

A second aspect of the invention relates to a control method for an engine able to control at least one of an intake valve and an exhaust valve via a driving mechanism actuated without a torque from an output shaft of the engine, and a transmission connected to the engine. The control method includes the step of adjusting the amount of air taken into the engine so as to absorb the difference in engine speed before and after the shift of the transmission by controlling at least one of the intake valve and the exhaust valve with the driving mechanism.

According to the second aspect, it is possible to obtain similarly effect as the first aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 21 is a time chart showing the open and closed states of the intake and exhaust valves in each cylinder when the valve timing is changed to reduce the engine speed.

DETAILED DESCRIPTION OF PREFERRED EMBODIMENTS

Figure 17:
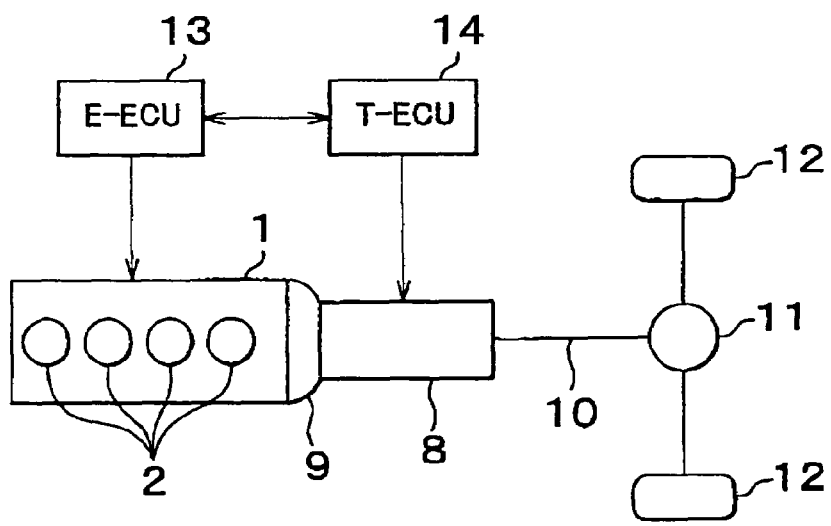
FIG. 17 is a block diagram of one example of a drive system having an engine and a transmission, which are the subject of this invention.

Hereinafter, preferred embodiments of the invention will be described. An engine and a transmission to which subjected to this invention is applied, are those to be mounted in a vehicle and used for driving the vehicle, for example. This engine 1 is, for example, a gasoline engine having a plurality of cylinders 2, such as that shown in FIGS. 17 through 19. Referring to FIG. 19, each cylinder 2 is provided with an intake valve 3 and an exhaust valve 4. The intake valve 3 and the exhaust valve 4 are basically valves that open and close according to the position of a piston 5, i.e., the crank angle. Drive mechanisms 6 and 7 are provided for each set of intake valve 3 and exhaust valve 4 to open and close them.

These driving mechanisms 6 and 7 drive the intake valve 3 and the exhaust valve 4 without receiving output torque from the engine 1. Instead, they use a suitable mechanism such as electromagnetic force or hydraulic pressure (fluid pressure). Accordingly, the driving mechanisms 6 and 7 are able to open and close the intake and exhaust valves 3 and 4 at a timing that is different from that during regular operation of the engine 1, e.g., close the intake valve 3 on the intake stroke and close the exhaust valve 4 on the exhaust stroke. In addition, the driving mechanisms 6 and 7 are also able to change not only the valve timing, but also the length of the stroke (lift amount) of the intake valve 3 and the exhaust valve 4 when they are opened and closed.

An transmission 8 is connected to the output side of the engine 1. With the transmission 8 shown in FIG. 17, a plurality of gear speeds are able to be established by selectively connecting a plurality of gear sets, which are constantly engaged, to an input shaft or an output shaft (both not shown), using a synchronizing mechanism (e.g., a synchronizer). This transmission 8 is connected to the engine 1 via a clutch 9 so that, by releasing the clutch 9 or controlling it so that it slips when a shift is made, the transfer of torque is able to be interrupted (i.e., a so-called torque interruption), or a state similar to this is achieved.

The transmission 8 shifts gears automatically. That is, an actuator, not shown, for driving the synchronizer and an actuator (e.g., a motor), also not shown, for engaging and releasing the clutch 9 are provided. A control mechanism, also not shown, is also provided for supplying hydraulic pressure and current to these actuators.

An output shaft 10 of the transmission 8 is connected via a differential 11 to driven wheels 12.

An electronic unit (E-ECU) 13 is provided in the engine 1 for controlling the supply of fuel, the throttle opening, ignition timing, the opening and closing of the intake valve 3 and exhaust valve 4, and the like. Further, an electronic control unit (T-ECU) 14 is provided in the transmission 8 for controlling the switching of the synchronizer and the engagement and release of the clutch 9. The E-ECU 13 and the T-ECU 14 include microcomputers as their main components. The E-ECU 13 and the T-ECU 14 perform calculations based on various data that has been input, as well as stored data, and output control command signals to the engine 1 or the transmission 8. The E-ECU 13 and the T-ECU 14 are also connected to each other so that data communication can take place between them.

Figure 18:
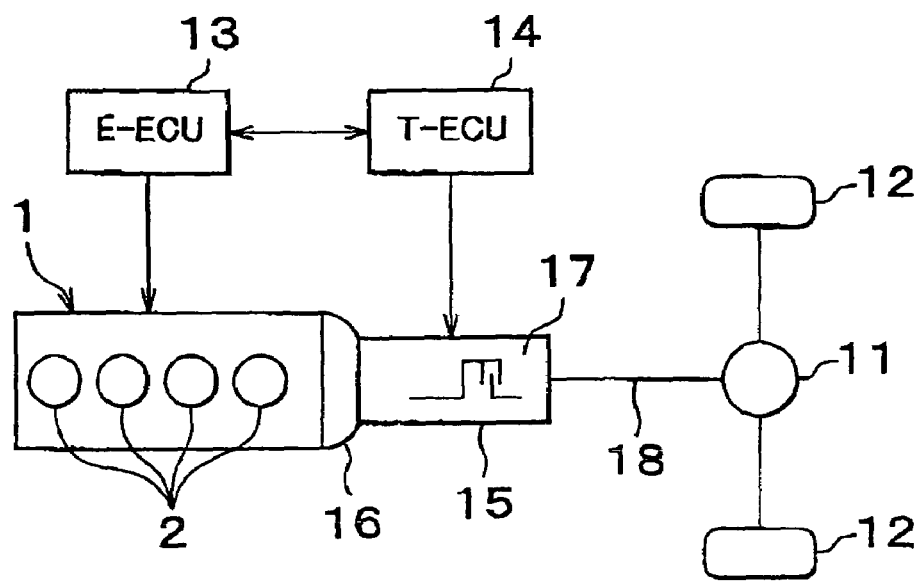
FIG. 18 is a block diagram of another example of a drive system having an engine and a transmission, which are the subject of this invention.
Figure 19:
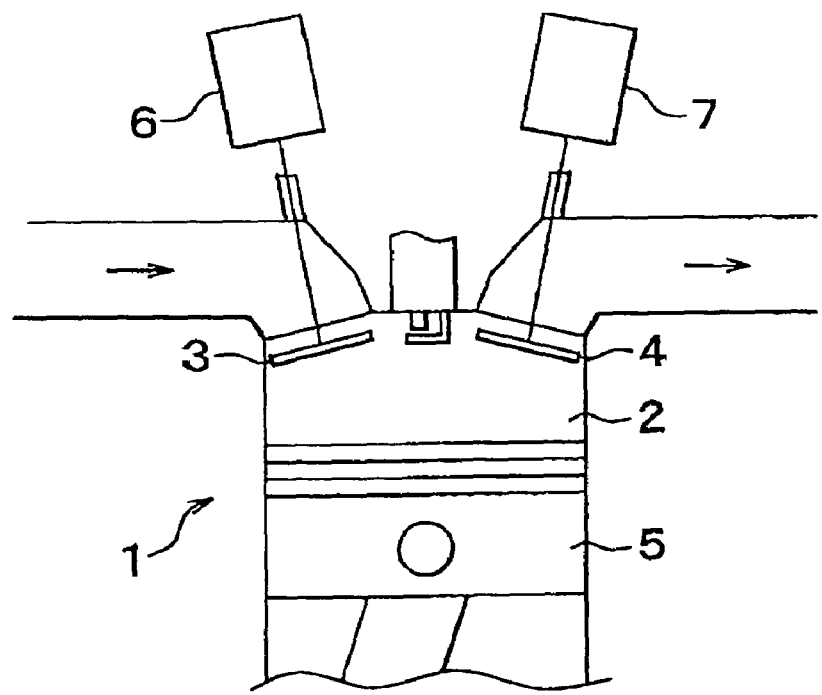
FIG. 19 shows a typical driving mechanism for an intake valve and an exhaust valve in the engine.

Meanwhile, in the example shown in FIG. 18, an automatic transmission 15, as the transmission, is connected to the engine 1. This automatic transmission 15 is a stepped type transmission for establishing a plurality of gear speeds, and includes a plurality of planetary gear mechanism assemblies, not shown, and a plurality of frictional engaging devices 17, such as a clutch and a brake, as the main components. This automatic transmission 15 is connected to the engine 1 via a torque converter 16 with a lockup clutch which serves as a hydraulic transmission. Accordingly, for example, an upshift in which the gear ratio is reduced is achieved by engaging a predetermined engaging device 17. Torque is constantly transmitted during that shift, so that a torque interruption such as that which occurs in the transmission 8 does not occur.

Further, with the construction shown in FIG. 18 as well, an output shaft 18 of the automatic transmission 15 is connected to the driven wheels 12 via the differential 11. The E-ECU 13 for controlling the engine 1 and the T-ECU 14 for controlling the automatic transmission 15 and the torque converter 16 are also provided. The configuration of these is similar to that shown in FIG. 17.

Figure 20A:
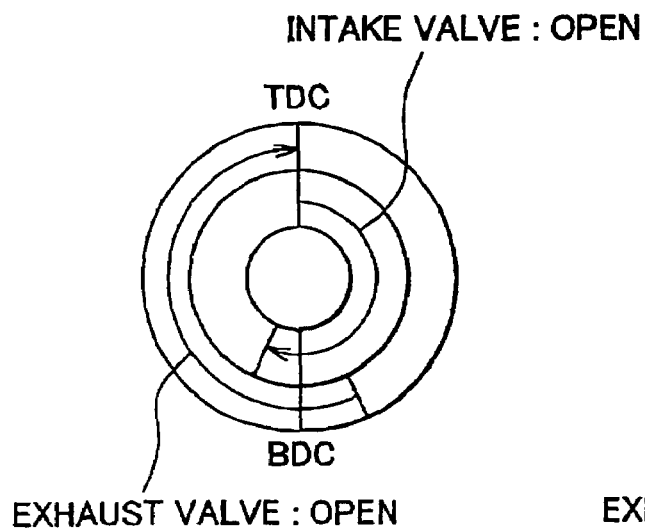
FIGS. 20A through 20D show valve timing when driving the engine at high output, when driving the engine at a light to medium load, when a slight engine brake is applied, and when a strong engine brake is applied.

The engine 1 described above is a cycle engine in which the intake valve 3 and the exhaust valve 4 can be freely controlled by their respective driving mechanisms 6 and 7. The intake air amount control to control the amount of air taken into the engine can be performed by controlling these driving mechanisms 6 and 7. An example of this intake air amount control is shown in FIGS. 20A through 20D. FIG. 20A shows the valve timing during high output. The intake valve 3 opens when the piston is at top dead center (TDC) so as to start the intake stroke. The intake valve 3 remains open until a predetermined number of degrees (i.e., length of time) after the piston is past bottom dead center (BDC) and closes on the compression stroke such that both the intake valve 3 and the exhaust valve 4 are closed on the compression stroke. Ignition occurs when the piston is near TDC so as to start the compression stroke, thus starting the expansion stroke. The exhaust valve 4 then opens a predetermined number of degrees before the piston reaches BDC so as to start the expansion stroke and remains open until the piston reaches TDC. High output (large torque) operation is performed by opening and closing the intake valve 3 and the exhaust valve 4 at a timing with the greatest pump efficiency in this way.

Figure 20B:
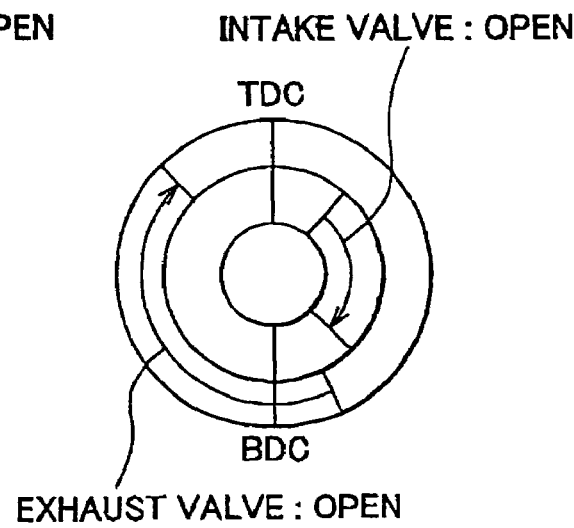

FIG. 20B also shows valve timing when the engine is operating with a light to medium load. The intake valve 3 opens a predetermined number of degrees after the piston has passed TDC on the intake stroke and closes a predetermined number of degrees before the piston reaches BDC on the same stroke. The intake valve 3 and the exhaust valve 4 are both closed on the compression stroke. Ignition occurs when the piston is near TDC so as to start the compression stroke, thus starting the expansion stroke. The exhaust valve 4 then opens a predetermined number of degrees before the piston reaches BDC and closes a predetermined a number of degrees before the piston reaches TDC on the expansion stroke. In this case, the torque is controlled by the operation angle (period during which the valve is open) during which the intake valve 3 is open and the opening and closing timing of the intake valve 3. Also, the efficiency of converting the fuel pressure to engine output is able to be adjusted by varying the opening timing of the exhaust valve 4. The intake air quantity can be limited by adjusting the internal EGR (exhaust recirculation) by changing the closing timing of the exhaust valve 4. Accordingly, the torque can be adjusted with the opening and closing timing of the exhaust valve 4. Thus, the engine can be shifted from light to medium load operation into high output operation by increasing the operation angle of the intake valve 3 so as to increase the intake air quantity.

Figure 20C:
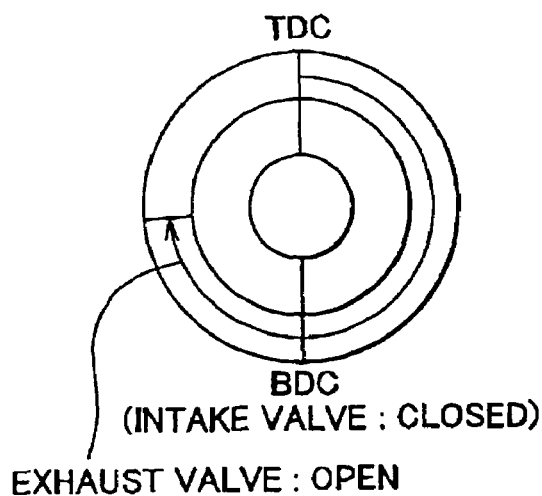
Figure 20D:
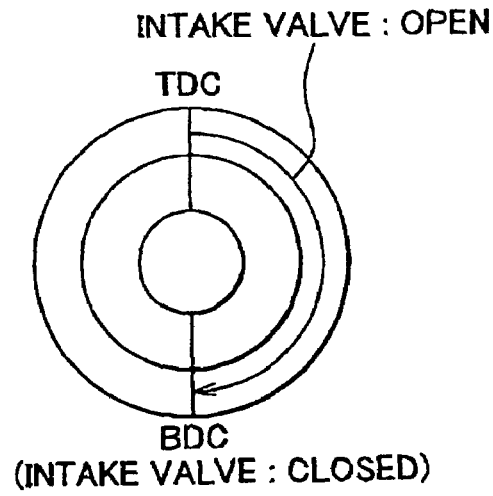

FIG. 20C shows the valve timing for generating a weak engine braking force. Because this valve timing is for generating engine brake, air is not drawn into the cylinder on the intake stroke and the exhaust valve opens at TDC and closes about 90 degrees after BDC on a stroke equivalent to the expansion stroke. Consequently, on the stroke equivalent to the expansion stroke, exhaust gas is briefly discharged when the exhaust valve 4 opens, but is then drawn back into the cylinder again. That exhaust gas is then compressed from just about 90 degrees before TDC to TDC. In contrast, to generate a strong engine braking force, the exhaust valve 4 opens at TDC and closes at BDC on the stroke equivalent to the expansion stroke. Consequently, on the stroke equivalent to the expansion stroke, exhaust gas is briefly discharged when the exhaust valve 4 opens, but is then drawn back into the cylinder again. The exhaust gas drawn back in at that time is compressed from BDC until TDC on the following stroke, as shown in FIG. 20D.

In generating this engine braking force, not only is there no combustion of the mixture, but the once-discharged exhaust gas is drawn back into the cylinder again and compressed. The torque consumed by the work of compressing the exhaust gas acts as the engine braking force which reduces the engine speed.

Figure 22:
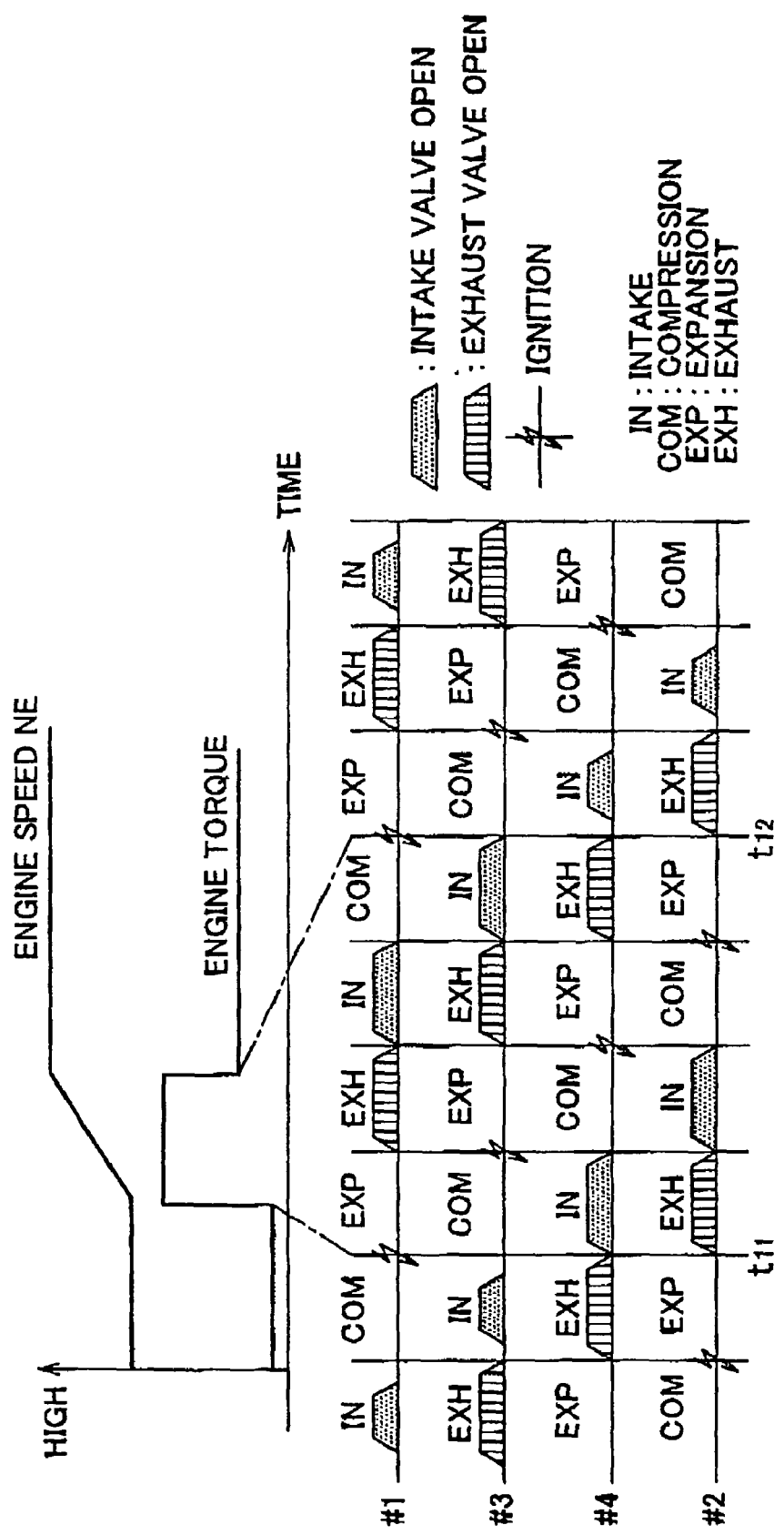
FIG. 22 is a time chart showing the open and closed states of the intake and exhaust valves in each cylinder when the valve timing is changed to increase the engine speed.

Changing the valve timing from valve timing for light to medium load operation to valve timing for high output operation, or changing to a valve timing to generate engine braking force can be done for each cylinder 2. An example of this is shown in FIGS. 21 and 22. The example shown in FIG. 21 is one for reducing an engine speed NE from high output operation to light or medium load operation. The fuel mixture is supplied to a first cylinder #1, a third cylinder #3, a fourth cylinder #4, and a second cylinder #2, in that order. The intake, compression, expansion, and exhaust strokes are performed in order in each cylinder 2. The intake valve 3 is open from TDC on the intake stroke until a predetermined number of degrees after BDC on the compression stroke.

When a command signal for reducing the engine speed NE at time t1 is output-when the first cylinder #1 starts the exhaust stroke, the exhaust valve 4 of that first cylinder #1 remains closed so that the exhaust gas is compressed instead of being discharged. On the intake stroke that follows, while the intake valve 3 remains closed, the exhaust valve 4 opens such that the compressed exhaust gas is briefly discharged but then drawn back into the cylinder 2 again. Then on the compression stroke that follows, the exhaust valve 4 is closed so that the exhaust gas is again compressed.

In contrast, the third cylinder #3 is on the expansion stroke at time t1. Accordingly, the intake valve 3 and the exhaust valve 4 of that cylinder are controlled just as in the first cylinder #1 on the following exhaust, intake, and compression strokes.

Valve timing control for generating engine braking force is not performed with the fourth cylinder #4. However, because the requested output amount is decreasing, the valve timing is controlled so that the operation angle on the intake stroke after time t1, i.e., the difference in the crank angle from when the intake valve 3 starts to open until the intake valve 3 closes, is decreased.

The valve timing in the second cylinder #2 is such that the intake stroke begins at time t1. The valve timing in this cylinder is such that the exhaust valve 4 remains open without the intake valve 3 opening. Consequently, exhaust gas is briefly discharged when the exhaust valve 4 opens on the intake stroke, but is then drawn into the cylinder again as the intake stroke continues. Both valves are then closed such that exhaust gas is then compressed on the compression stroke that follows. Thereafter, control returns to normal.

The valve timing control as described above continues until time t2 when the engine speed NE drops to a predetermined speed. Therefore, instead of the mixture being combusted in the first cylinder #1, the third cylinder #3, and the second cylinder #2, the exhaust gas is compressed, or the exhaust gas that was briefly discharged is drawn back into the cylinder and compressed. The torque consumed in that compression acts as a negative torque on the engine 1. As a result, the engine speed NE rapidly and greatly decreases.

"Engine torque" shown by the solid line in FIG. 21 schematically shows a torque control command value, i.e., control to decrease the engine torque. Therefore, the engine torque that is actually generated or output differs depending on the inertia torque that follows a change in speed and the torque control amount that is based on the control of the valve timing or the control of the valve lift amount. For example, at the inertia phase of the shift, the engine torque can be changed linearly toward a target torque, as shown by the single dot-dash line. Alternatively, the engine torque can be set to as small a torque as possible that is within a range enabling independent rotation of the engine 1 to be maintained and shifting to proceed.

Next, control when increasing the engine speed NE will be described with reference to FIG. 22. When a command signal is generated to increase the engine speed at time t11 when the engine 1 is operating at a predetermined light or medium load, the time during which the intake valve 3 is open is increased the roughly amount shown in FIG. 20A on one intake stroke in each cylinder 2 after that command signal is generated. As a result, the torque generated in each cylinder 2 increases such that there is a large and rapid increase in the engine speed NE.

Figure 1:
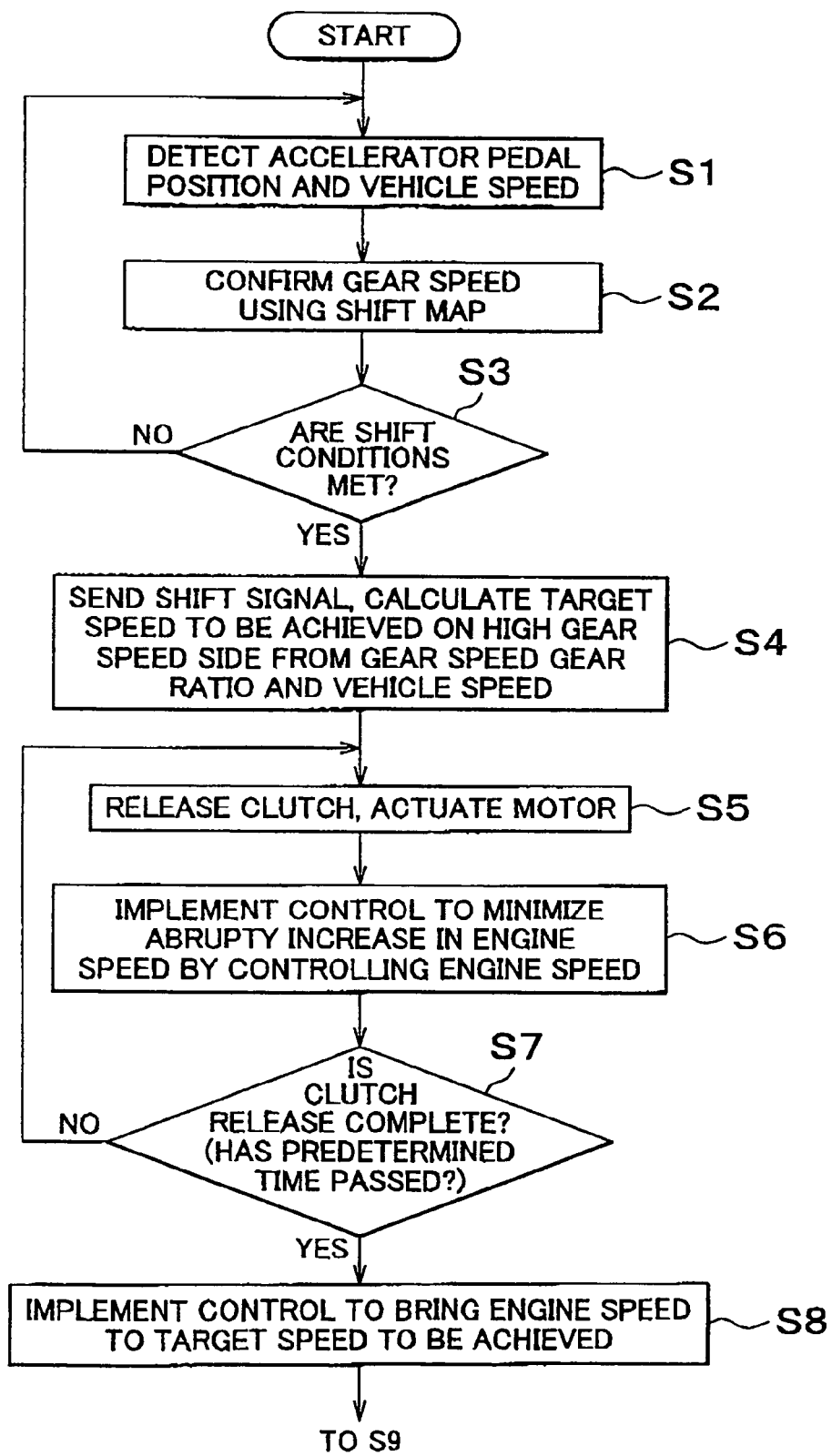
FIG. 1 is a part of a flowchart for explaining a control example according to a first exemplary embodiment of the invention.
Figure 2:
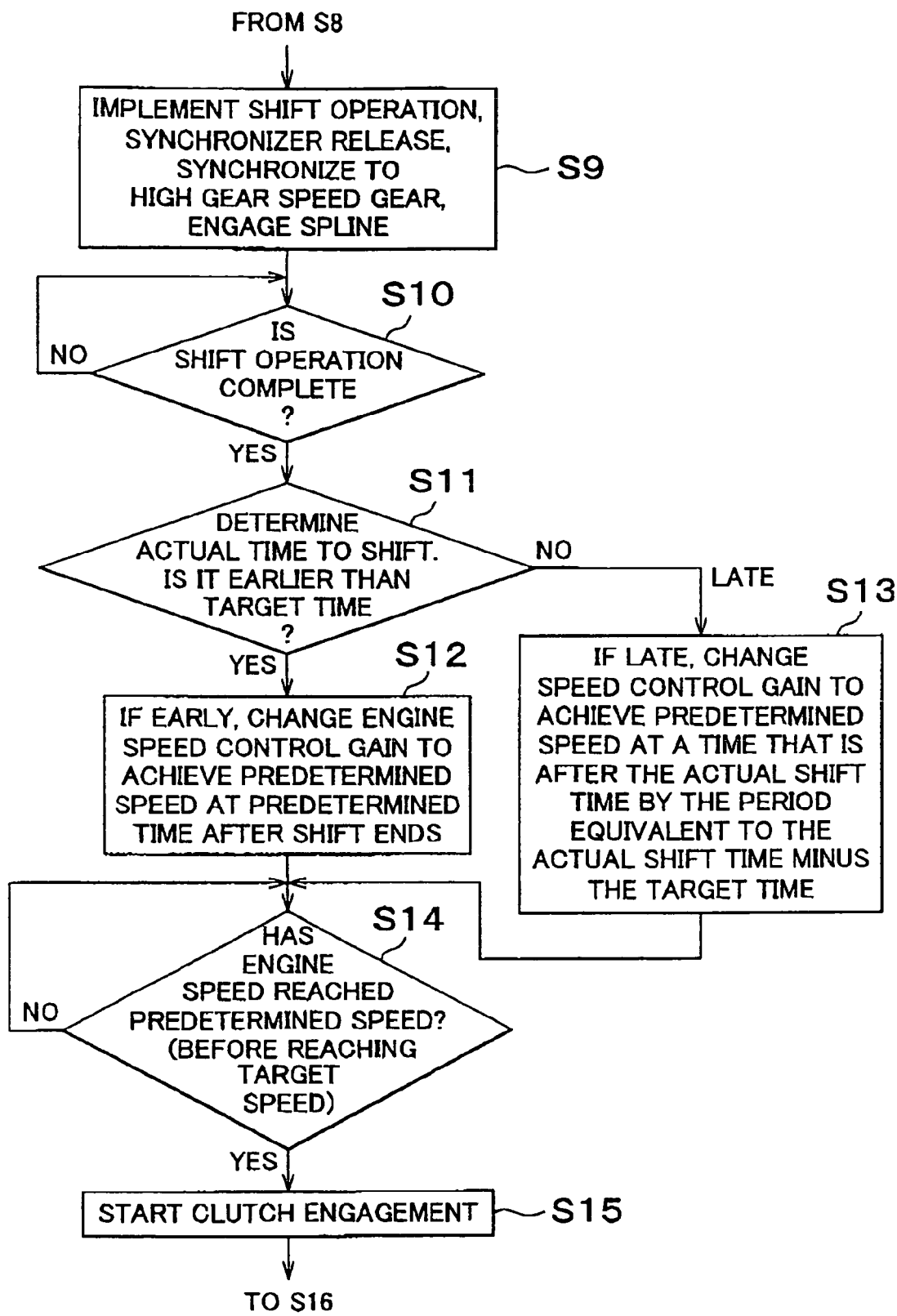
FIG. 2 is another part of the flowchart shown in FIG. 1.
Figure 3:
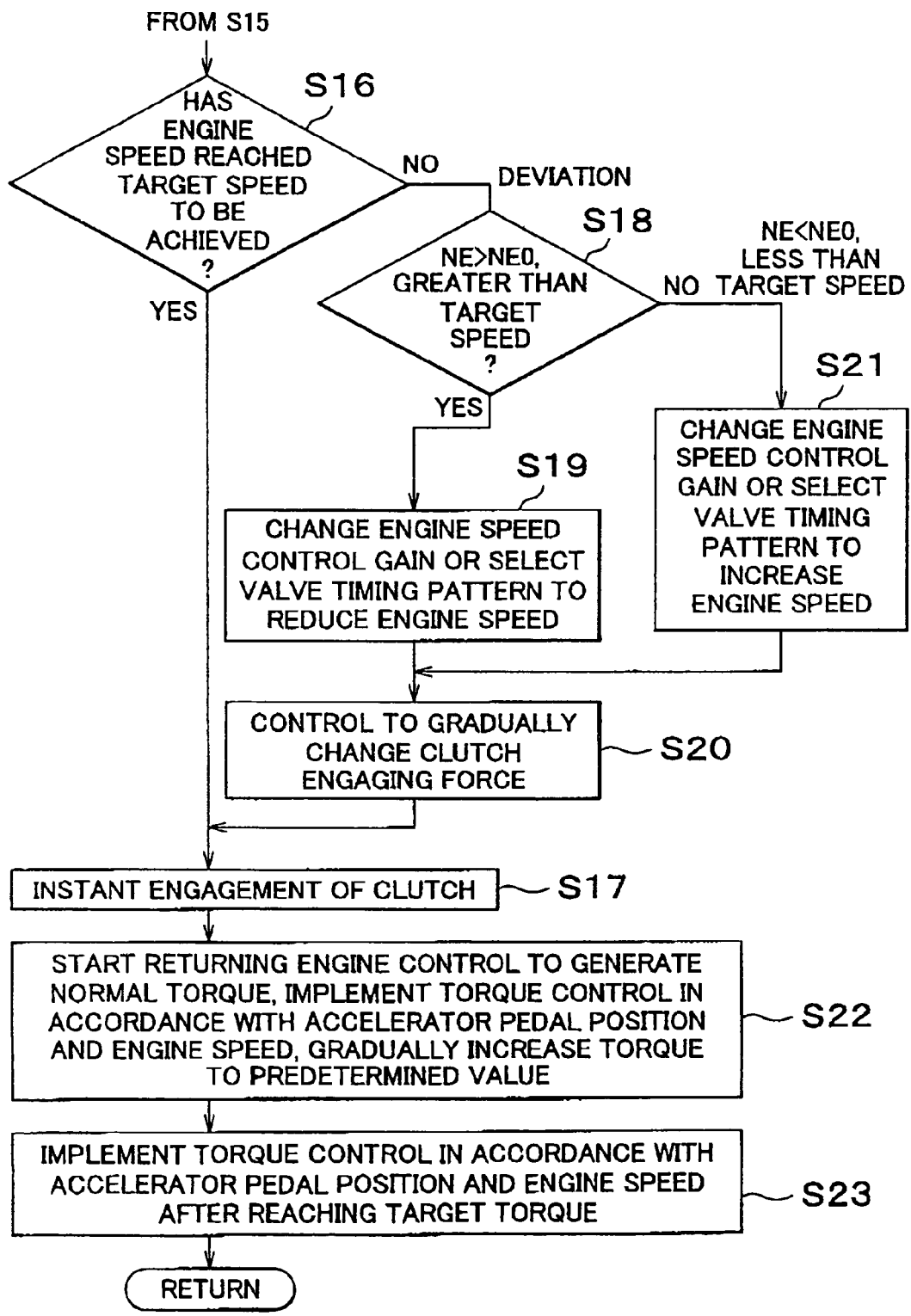
FIG. 3 is still another part of the flowchart shown in FIG. 1.

The control device (T-ECU 14, E-ECU 13) according to this exemplary embodiment of this invention effectively uses the aforementioned function of the engine 1 to shift the transmission 8 and automatic transmission 15. From among the control examples of these transmission 8 and automatic transmission 15, the control example of the engine 1 and the transmission 8 shown in FIG. 17 will be described as the first exemplary embodiment. FIGS. 1 through 3 show that control example. First the accelerator pedal position and the vehicle speed are detected (Step S1). The accelerator pedal position denotes a requested output amount and is expressed by data equivalent to a depression angle of an accelerator pedal, not shown. Accordingly, data other than that indicating the requested output amount may also be used instead of the accelerator pedal position.

Next, a gear speed is confirmed using a shift map (Step S2). This shift map is data that has been recorded in advance in the T-ECU 14 for the transmission. In this shift map, a shifting region is set which has the accelerator pedal position data or data in place of this, and vehicle speed data or data in place of this as parameters. Therefore, in Step S2, the gear speed to be established is confirmed based on the accelerator pedal position and the vehicle speed that were detected in Step S1, and the map It is then determined whether a shifting condition for changing gear speeds has been met by comparing the gear speed confirmed as described above with the current gear speed (Step S3). For example, when the accelerator pedal is depressed so that the vehicle takes off and the vehicle speed increases to a predetermined vehicle speed, the gear speed to be established becomes a second speed or a third speed. There is therefore a difference between the gear speed to be established and the gear speed that is actually established, such that the shift condition is met.

When the determination in Step S3 is NO due to the fact that the vehicle speed has not increased sufficiently or the like, the process returns to Step S1. Conversely, when the determination in Step S3 is YES because the vehicle speed has increased sufficiently or the like, a shift signal for shifting to the gear speed confirmed in Step S2 is sent and the engine speed (target speed to be achieved) at the point at which high gear speed was achieved is calculated based on the gear speed gear ratio (the gear change ratio on the high gear speed side) and the vehicle speed (Step S4).

An operation to release the clutch 9 is performed when the shift signal is sent (Step S5). This releases the clutch 9 using a predetermined actuator such as a motor.

When the clutch 9 is released, the load on the output side of the engine 1 (the load from the transmission 8 side) is reduced. The engine 1 is also controlled to increase its output because the accelerator pedal is depressed. As a result, the engine speed NE of the engine starts to increase when the clutch 9 is released, i.e., the engine speed of the engine 1 starts to abruptly increase. To prevent this, control to prevent the engine speed from abruptly increasing is performed (Step S6). More specifically, this control makes the engine itself generate a negative torque by controlling the valve timing in at least one of the cylinders as shown in FIG. 20C, FIG. 20D, or FIG. 21. The control amount with respect to the valve timing control, i.e., the opening and closing timing of the intake valve 3 and the exhaust valve 4 may also be determined based on the engine speed NE or the accelerator pedal position or the like at that time.

Release of the clutch 9 is then confirmed in Step S7. This confirmation can be determined by the stroke amount toward the release side of the clutch 9 or the load for release, or according to the passage of a predetermined amount of time after starting of the release. When the determination in Step S7 is NO, i.e., when release of the clutch 9 is not yet complete, the process returns to Step S5 and control continues as before. Conversely, when the determination in Step S7 is YES, control is performed to change the engine speed NE to the target engine speed calculated in Step S4 (Step 58). This control controls the timing of the intake valve 3 and the exhaust valve 4 to increase and decrease the engine torque so as to synchronize the engine speed NE with the speed of the gear speed after shifting. That is, the control matches the engine speed NE with the target speed to be achieved.

A shift operation is performed either following or in parallel with the control performed in Step S8 (Step S9). The transmission 8, which is the subject here, is configured so as to establish the gear speed by selectively connecting the gear sets, which are in constant mesh, with either the output shaft or the input shaft by the synchronizer. Therefore, this shift operation is performed by releasing the synchronizer, so-called synchronizer-release (or shifting out of gear), that has achieved a gear speed on the low speed gear speed side, and engaging a synchronizer for the high gear speed side, or so-called high speed gear synchronizer, and spline engagement.

This shift operation is achieved by operating an actuator such as a motor in a predetermined direction over a predetermined distance. Therefore, it is determined whether the shift operation is completed based on the shift stroke amount (Step S10). That is, it is determined whether an operation equivalent to a normal shift operation following a selecting operation with a manual transmission is complete.

Control as before continues until the determination in Step S10 is YES. Then, when the determination in Step S10 is YES, the time from when shift control started until the determination in Step S10 was YES is determined, and it is determined whether that time is less (i.e., shorter) than a target time set in advance (Step S11).

With the engine 1 and the transmission 8, control of the engine speed NE and switching control of the gear change ratio are performed separately while the transmission of torque between the engine 1 and the transmission 8 is interrupted. Therefore, when the clutch 9 is engaged, it is necessary that the engine 1 and the transmission 8 be in a state after shifting. Therefore, in order to match the progressing state of the control of the engine 1 and the transmission 8, the time for the shift operation is determined in Step S11.

Therefore, when the determination in Step S11 is YES, the shift operation of the transmission 8 is progressing relatively quickly. Therefore, a control gain for the engine speed control is changed to achieve a predetermined speed at a predetermined time after shifting ends (Step S12). Conversely, when the determination in Step S11 is NO, the control gain for the engine speed control is changed to achieve a predetermined speed at a time that is after the actual shift time by the period equivalent to the actual shift time minus the target time (Step S13).

When the predetermined time and the target time are the same, the process proceeds on to Step S14, without changing the control gain with respect to the engine speed control.

Then it is determined whether the engine speed NE has reached the predetermined speed (Step S14). The predetermined speed, which is used as a reference for this determination, is preset as a speed before reaching the synchronization speed (the target speed) of the gear speed after shifting. With an upshift, the engine speed NE decreases when the clutch is engaged. Therefore, the predetermined speed is greater than the target speed. The control continues as before until the determination in Step S14 is YES, at which time control for engaging the clutch 9 begins (Step S15).

In the process of engaging the clutch 9, it is determined whether the engine speed NE matches the target speed (Step S16). When the determination in Step S16 is YES, the clutch 9 is immediately and quickly engaged (Step S17). That is, the torque transmitted by the clutch 9 is increased. Because the engine speed NE is already synchronized with (i.e., has become nearly equal to) the engine speed after shifting, engagement of the clutch 9 does not cause a change in the engine speed. As a result, virtually no inertia torque, which accompanies a change in the engine speed, is generated, so virtually no shock is generated. The increased torque capacity of the clutch 9 is, for example, a torque capacity such that the engine torque is able to be transmitted to the transmission 8 without the clutch 9 slipping, or a torque capacity that adds a predetermined safety factor into the torque capacity appropriate for the engine torque.

Conversely, when the determination in Step S16 is NO, a deviation in the engine speed is determined. That is, it is determined whether the engine speed NE is faster than a target speed NE0 (Step S18). This determines whether the engine speed NE is deviating toward the high gear speed side from the target speed NE0. The target speed may include a predetermined region. That is, a target speed NE0±α may be used in stead of the target speed NE0.

When the determination is YES in Step S18, control is then performed to reduce the engine speed NE (Step S19). An example of this control is control to change the control gain for controlling the engine speed NE such that the engine speed NE decreases, or control to change the pattern of the control of the intake valve 3 and the exhaust valve 4 such that the engine speed NE decreases.

Then, control is performed for gradually changing (increasing) the engaging force of the clutch 9 a predetermined amount (Step S20). Because the engine speed NE is not synchronized with the engine speed after shifting, the speed changes when the clutch 9 is engaged. If this change is abrupt, it is conceivable that it may cause a shock due to the large amount of corresponding inertia torque. Therefore, control is performed in Step S20 to slow the change in engine speed to prevent this shock. The engaging force (torque capacity) of the clutch 9 that was increased is, for example, a torque capacity in which the engine torque is able to be transmitted without slipping, or is a torque capacity that adds a predetermined safety factor into the torque capacity appropriate for the engine torque.

Conversely, when the determination in Step S18 is NO, the engine speed NE is slower than the target speed NE0. In this case, control is performed to increase the engine speed NE (Step S21). An example of this control is control for changing the control gain for controlling the engine speed NE such that the engine speed NE increases, or control for changing the pattern of the intake valve 3 and the exhaust valve 4 such that the engine speed NE increases. Then, the process proceeds to Step S20, in which the clutch 9 is gradually engaged.

At the point just before the clutch 9 is completely engaged in Step S20, the process proceeds on to Step S17, in which the clutch 9 is made to engage quickly. At this point, there is only a slight difference between the engine speed NE and the target speed NE0 so even if the clutch 9 is suddenly engaged, virtually no shock will occur.

After the clutch 9 is completely engaged by the control in Step S17, the engine torque is returned to torque based on normal control (Step S22). In the shift process described above, the output torque of the engine 1 is controlled such that the engine speed NE is synchronized with the speed after shifting, without the output torque of the engine 1 being controlled based on the accelerator pedal position, which indicates the requested output amount. This is performed by controlling the intake valve 3 or the exhaust valve 4 so as to suppress the output torque when there is an upshift while the accelerator pedal is depressed (i.e., on a power on state).

Therefore, the engine torque when the change in gear change ratio of the transmission 8 is already complete, when the engine speed NE is synchronized with the speed after shifting, and when the clutch 9 is completely engaged, is not the same as the torque according to the requested output amount. Therefore, in Step S22, control is performed such that the engine torque comes into accordance with the accelerator pedal position, which corresponds to the requested output amount, and the speed of the gear change ratio after the upshift. More specifically, the valve timing that was controlled so as to inhibit the output torque is returned to normal timing. In this case, the engine torque is controlled so as to change gradually in order to prevent a shock from being generated.

After the target torque according to requested output amount has been reached, the engine 1 is controlled so that the engine torque corresponds to the driving state of the vehicle at that point. More specifically, the engine 1 is controlled such that the engine torque corresponds to the accelerator pedal position and the engine speed under normal control and the like (Step S23). The throttle opening, fuel injection quantity, and valve timing are examples of some of what is controlled.

Figure 4:
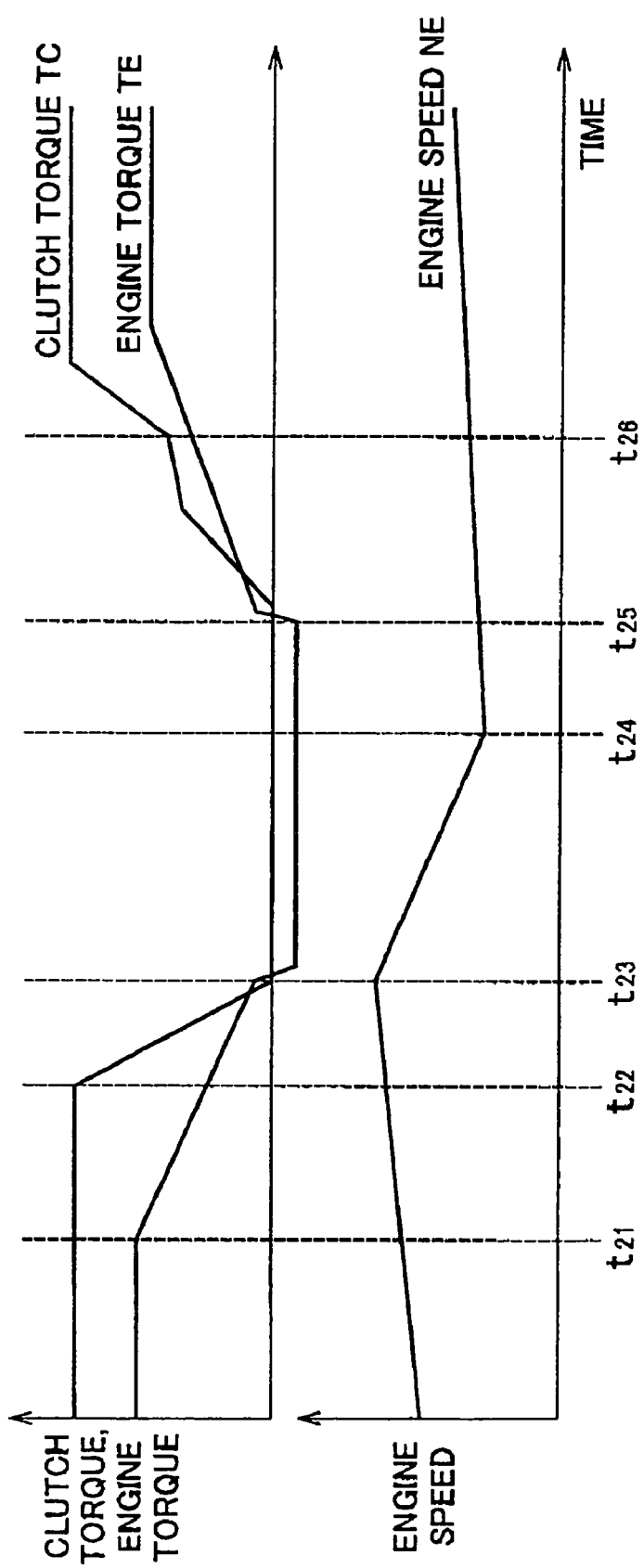
FIG. 4 shows a typical change in engine speed when the control shown in FIGS. 1 through 3 is implemented.

FIG. 4 shows the change in the engine speed NE when the foregoing control is performed. That is, when the shift conditions are met at time t21, the valve timing of the intake valve 3 and the exhaust valve 4 is controlled so as to reduce an engine torque TE. The torque capacity, i.e., the engaging force, of the clutch 9 is gradually reduced at time t22, at which time the engine speed NE is reduced to the point it will not abruptly increase. At time t23, at which time the torque capacity TC of the clutch 9 is reduced to, or below, a predetermined value, the output torque of the engine 1 is reduced, which makes the engine speed NE start to drop abruptly. Further, the clutch 9 is in a so called released state such that torque ceases to be transmitted from the transmission 8 to the engine 1. In this case, because the torque capacity TC of the clutch 9 decreases, no torque that accompanies engine speed NE will appear as output shaft torque, i.e., no shock will be generated. According to the flowchart, the clutch torque drops before the engine torque drops. In actuality, however, the clutch torque either drops at the same time as, or after, the engine torque drops.

In this way, the shift operation of the transmission 8 is performed while the clutch 9 is released and the engine speed NE drops. That is, the synchronizer on the low speed gear speed side is released and the synchronizer on the high gear speed side is engaged in its place. At almost the same time that this shift operation is complete, the engine speed NE reaches a predetermined speed (a speed having a predetermined difference with respect to the gear speed after shifting) (time t24).

Then it is confirmed that the difference between the engine speed NE and the target speed NE0 is within a predetermined value at time t25, and almost simultaneously, the torque capacity TC of the clutch 9 is increased. In this case, because the torque on the transmission 8 side acts on the engine 1 so as to reduce the engine speed NE, the engine torque TE is increased 80 as to maintain the engine speed NE. It is then determined that the engine speed NE is synchronized with the gear speed after shifting at time t26. Thereafter, normal torque control is performed.

Therefore, according to this shift control, the speed of the engine 1 is controlled by the valve timing and the shift operation is performed by the transmission 8 while the transmission of torque is interrupted by the clutch 9. Therefore, these controls proceed quickly and the shifting speed improves so that there is better shift response. In addition, when the shift operation is complete and the clutch 9 engages, the engine speed NE is nearly synchronized with the gear speed after shifting so there is virtually no shock, or the clutch 9 is engaged while the engine torque continues to be controlled by adjusting the valve timing. Therefore, it is possible to prevent or minimize shock. In other words, shock is able to be prevented or minimized even if the engagement timing of the clutch 9 is irregular.

The foregoing control example is an example in which control is performed of the engine 1 and the transmission 8 while the clutch 9 is released. Shifting may also be performed, however, while the clutch 9 has a certain amount of torque capacity, i.e., while the clutch 9 is slipping. An example of this as a second exemplary embodiment of the invention will hereinafter be described.

Figure 5:
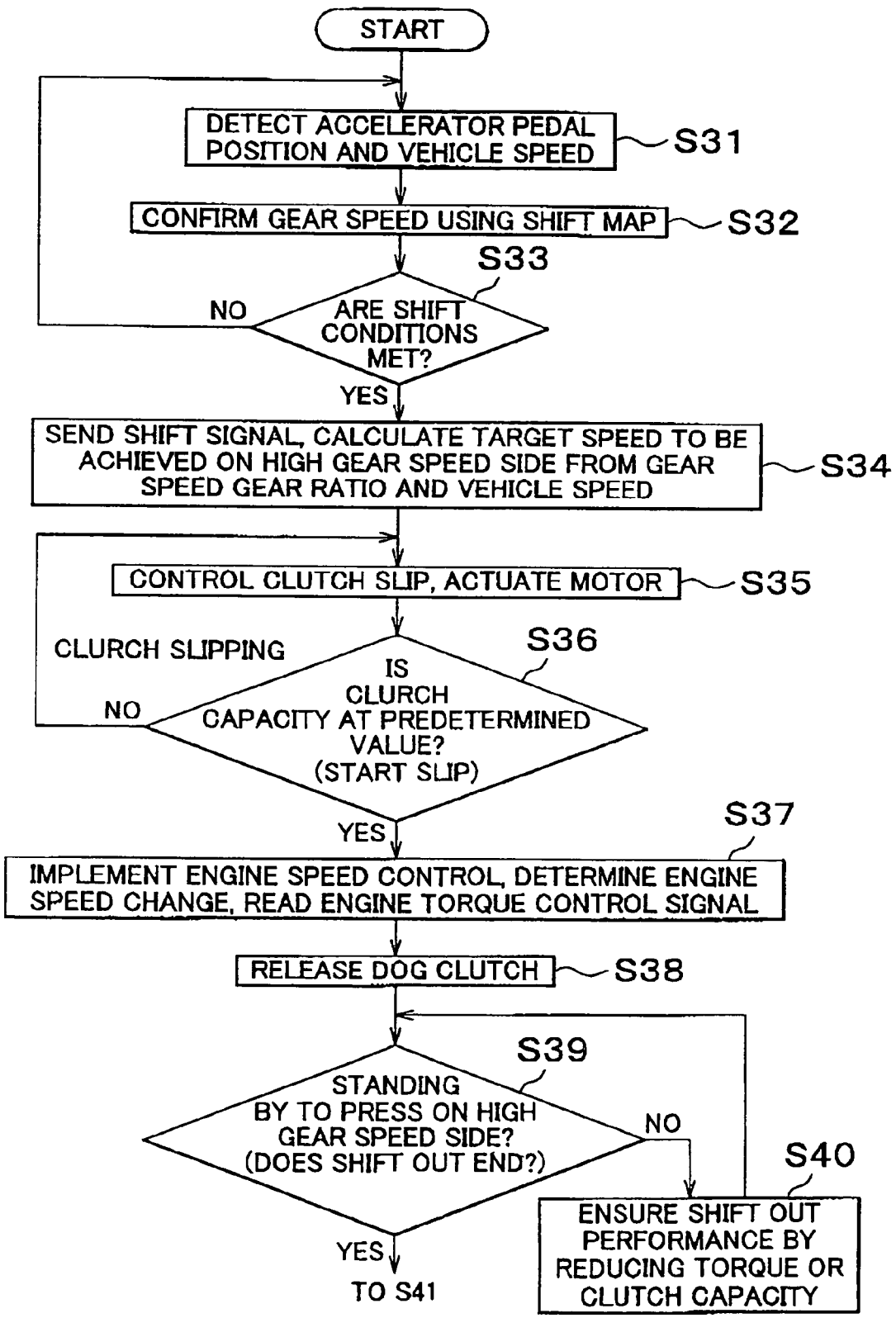
FIG. 5 is a part of a flowchart for explaining a control example according to a second exemplary embodiment of the invention.
Figure 6:
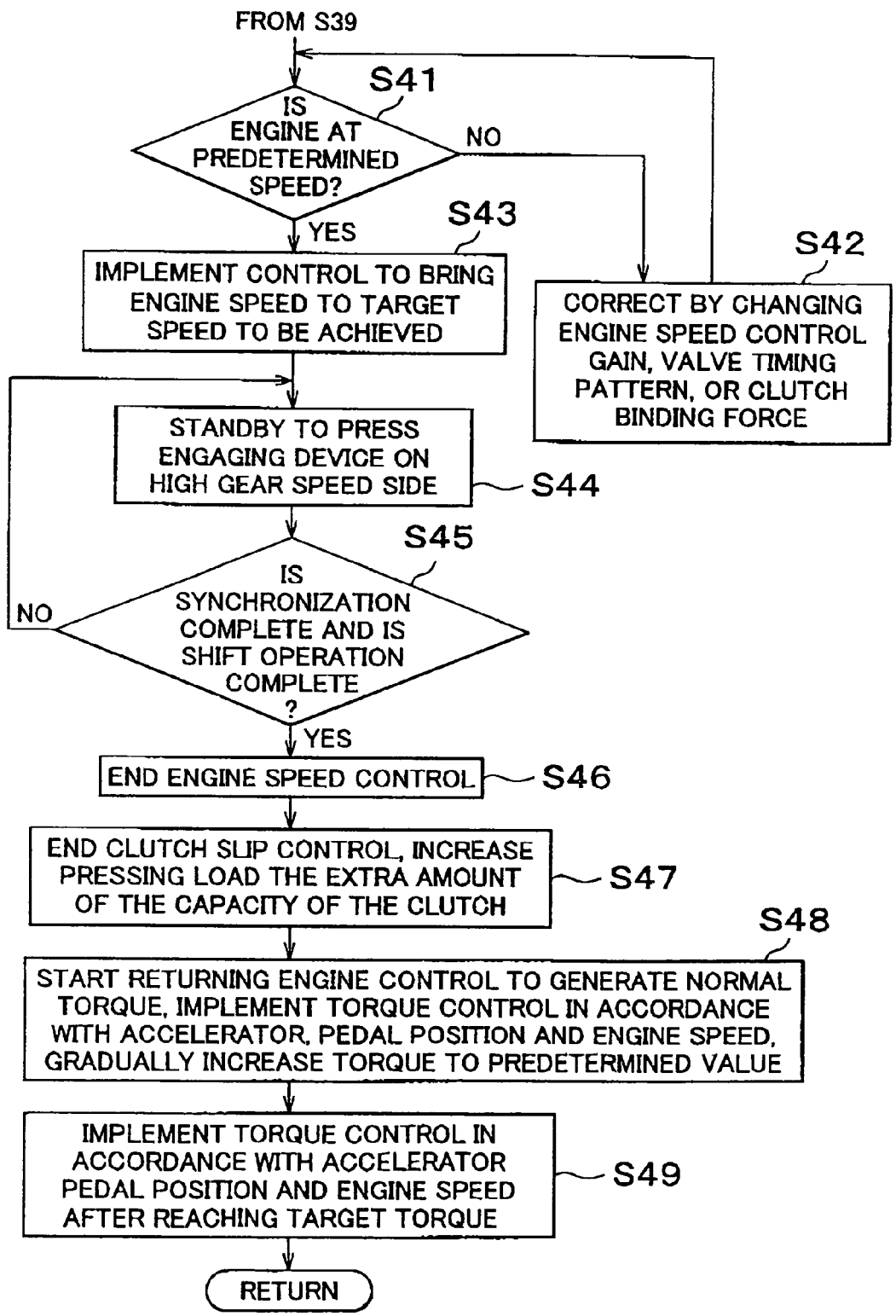
FIG. 6 is another part of the flowchart shown in FIG. 5.

FIGS. 5 and 6 are flowcharts for explaining this control example. Detecting the accelerator pedal position and the vehicle speed (Step S31), confirming the gear speed using a shift map (Step S32), determining whether the shift conditions are met (Step S33), and sending a shift signal and calculating the engine target speed (target speed to be achieved) of the gear change ratio of the high gear speed side (Step S34) are all performed in the same way as Steps S1 through S4 in the first control example.

Next, slip control is performed such that the clutch 9 is controlled to a predetermined slip speed (Step S35). This is performed by controlling an actuator for the clutch 9, such as a motor. Then it is determined whether a slip amount, or a clutch capacity (torque capacity), of the clutch 9 has reached a predetermined value (Step S36). Control continues as before until the determination in Step S36 is YES, at which point engine speed control is performed (Step S37).

This engine speed control is just like the control in Step S6 of the first control example, in which the engine speed NE is set to a target speed by controlling the valve timing of the intake valve 3 or the exhaust valve 4 in one of the cylinder 2 of the engine 1 such that negative torque is temporarily generated in that cylinder 2. In Step S37, a change in the engine speed NE is determined and an engine torque control signal read.

In this way, a release operation of a dog clutch in the synchronizer establishing the gear speed before shifting is performed while the engine speed NE is controlled so that it does not abruptly increase (Step S38). This can be performed by an actuator such as a motor provided for each synchronizer, for example.

Next it is determined whether a preparation state for engagement of the synchronizer for setting a high gear speed is established, i.e., whether preparation for pressing by the synchronizer is complete (Step S39). In other words, it is determined whether preparation for establishing the high gear speed is not complete because it is taking time to release the synchronizer (i.e., shift out of gear) that is establishing the low speed gear speed.

When the determination in Step S39 is NO, i.e., it is taking time to shift out of gear, control is performed to reduce the torque input from the engine 1 to the transmission 8 (Step S40). More specifically, the engine torque is temporarily reduced by controlling the valve timing or ignition timing of the engine 1, or the clutch 9 is temporarily controlled to the release side. Reducing the torque input to the transmission 8 reduces the friction force exerted on a sliding contact surface of the synchronizer, thus making it easier to shift out of gear.

When the determination in Step S39 above is YES, or when the control of Step S40 is performed such that the determination in Step S39 is YES, it is determined whether the engine speed NE is at a predetermined speed (Step S41). This is to determine whether the engine speed NE is tending to increase abruptly, and also to determine whether the engine speed NE is dropping excessively.

When the determination in Step S41 is NO, i.e., when the engine speed NE has not yet reached the predetermined speed, one or all of the engine speed control gain, the control pattern of the valve timing, or the binding force (engaging force) of the clutch 9 are changed (corrected) such that the engine speed NE is set to the predetermined speed (Step S42). In order to set the engine speed NE to the predetermined speed, when the engine speed control gain, the valve timing control pattern, or the clutch binding force is corrected in Step S42, the value after that corrected is used for control thereafter. That is, learning correction is performed.

When the determination in Step S41 is YES with or without performing the control in Step S42, the engine speed NE is controlled to the target speed to be achieved according to the gear change ratio after shifting (Step S43). This control is similar to that of Step S8 in the previous control example, in which the valve timing of the intake valve 3 or the exhaust valve 4 is controlled or the ignition timing together with valve timing are controlled.

Then, the synchronizer (engaging device) for setting the high gear speed after shifting is set in a standby-to-engage state (standby-to-press) and the engagement operation is then performed (Step S44). As a result, it is determined whether the synchronizer on the high gear speed side performs a synchronization and whether that stroke is complete (Step S45). That is, it is determined whether the shift operation of the transmission 8 is complete.

When the shift operation is complete after the control continued as before the such that the determination in Step S45 is YES, speed control of the engine 1 ends (Step S46). During the shift described above, the valve timing of the engine 1 is controlled such that the engine speed NE does not increase abruptly. Because this is control suppresses the engine torque, the control is not based on the accelerator pedal position that corresponds to the requested output amount. Then when the shift operation of the transmission 8 is complete, the control for suppressing the engine torque ends. Also, the slip control of the clutch 9 ends and the binding force (pressing load) of the clutch 9 increases a predetermined amount according to the extra torque capacity of the clutch 9 so as to become a clutch capacity (binding force) in accordance with the engine torque (Step S47).

Then the engine torque returns to a torque based on normal control (Step S48). The engine 1 is controlled so that the engine torque corresponds to the driving state of the vehicle at that point. More specifically, the engine 1 is controlled to have an engine torque corresponding to the accelerator pedal position and the speed and the like (Step S49). The control of these Steps S48 and S49 is just like the control of Steps S22 and S23 in the previous control example.

Therefore, even with a configuration in which the control shown in FIGS. 5 and 6 is performed, the control of the engine speed is performed according to an increase or decrease in the torque of the engine 1 itself. Accordingly, the engine speed is able to be changed rapidly and greatly. Also, because the shift control of the transmission 8 is performed in parallel with this, shift control is able to be completed in a short amount of time. As a result, the shift response is able to be improved. Also, at the point when the slip control of the clutch 9 ends, the engine speed is nearly synchronized with the engine speed after shifting by controlling the engine 1 itself. Accordingly, there is almost no speed change brought about by the increase in the torque capacity of the clutch 9, thus the so-called shift shock is able to be prevented or reduced.

Next, an example with a vehicle having an automatic transmission 15, shown in FIG. 18, will be described as a third exemplary embodiment. The automatic transmission 15 is connected via a torque converter 16 with a lockup clutch to the engine 1 such that shifting is performed while torque is being input from the engine 1. In this case, both control in which the inertia torque following a change in engine speed is absorbed by a frictional engaging device on an engaging side while speed control of the inertia phase is performed on the engine 1 side, and control in which a negative torque equivalent to the inertia torque following a change in engine speed is generated by the engine 1, are possible. The inertia phase during an upshift refers to a state where both a frictional engaging device on a high speed gear side and a fictional engaging device on a low speed gear side are slipping.

Figure 7:
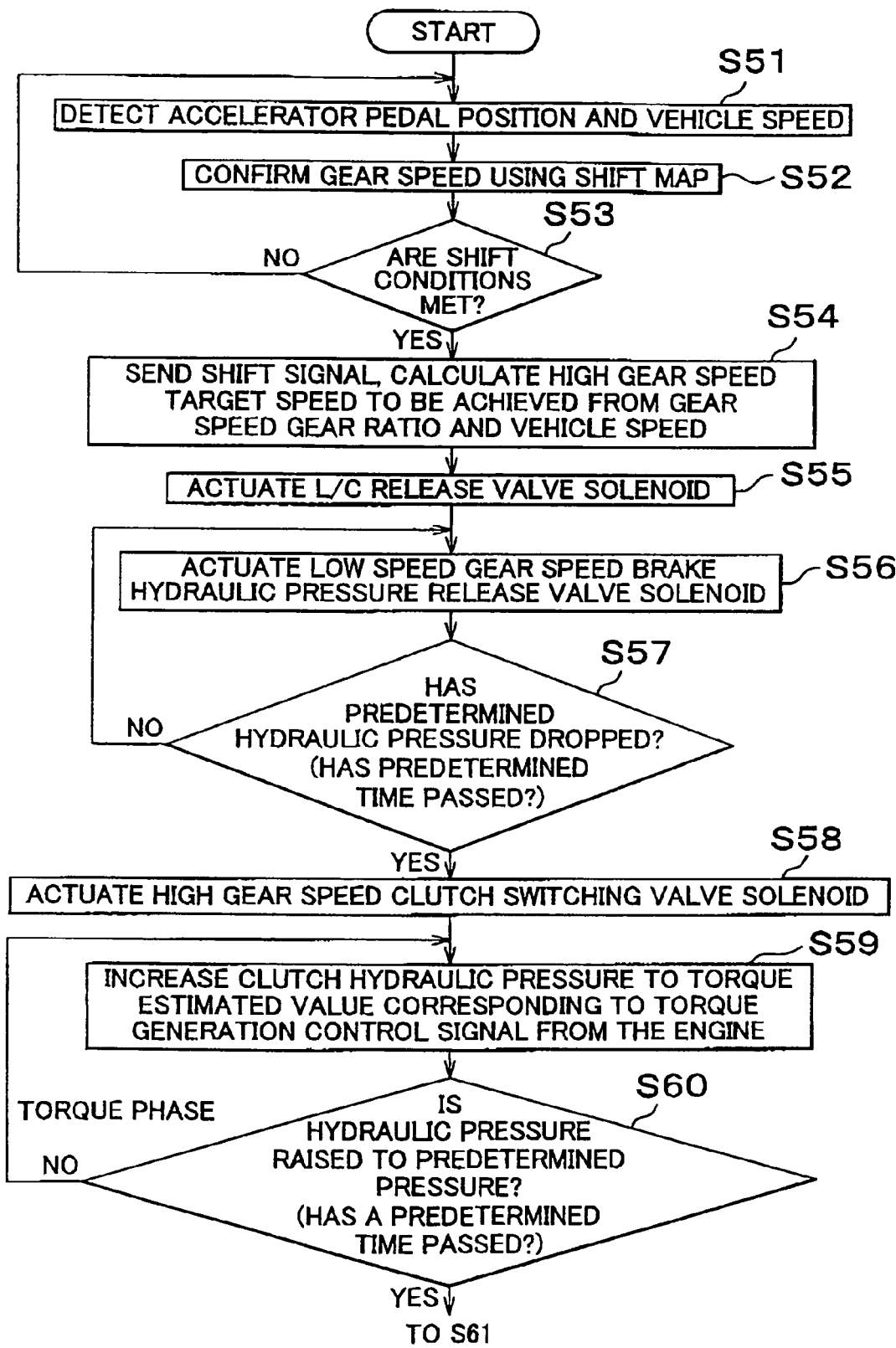
FIG. 7 is a part of a flowchart for explaining a control example according to a third exemplary embodiment of the invention.
Figure 8:
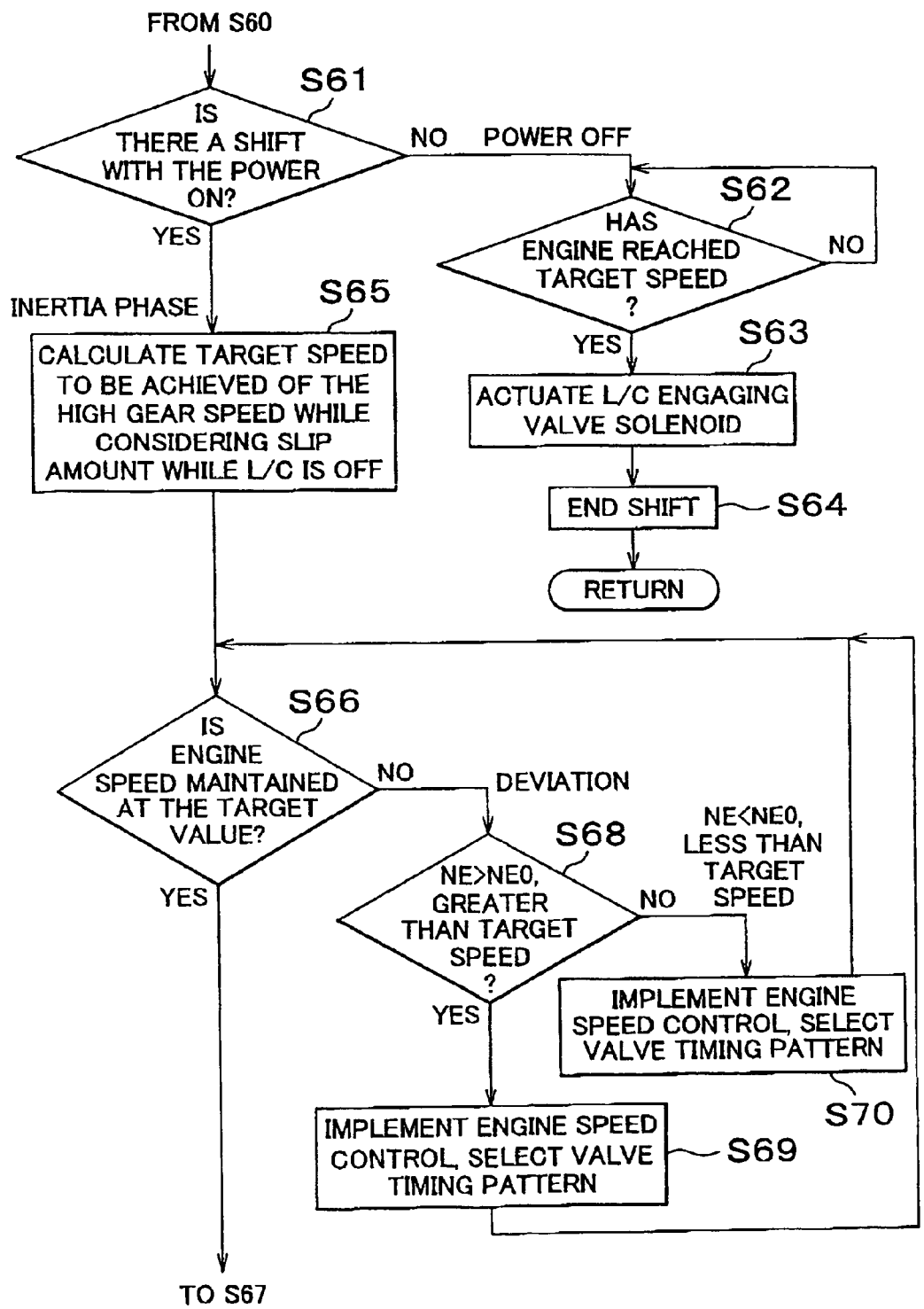
FIG. 8 is another of the flowchart shown in FIG. 7.
Figure 9:
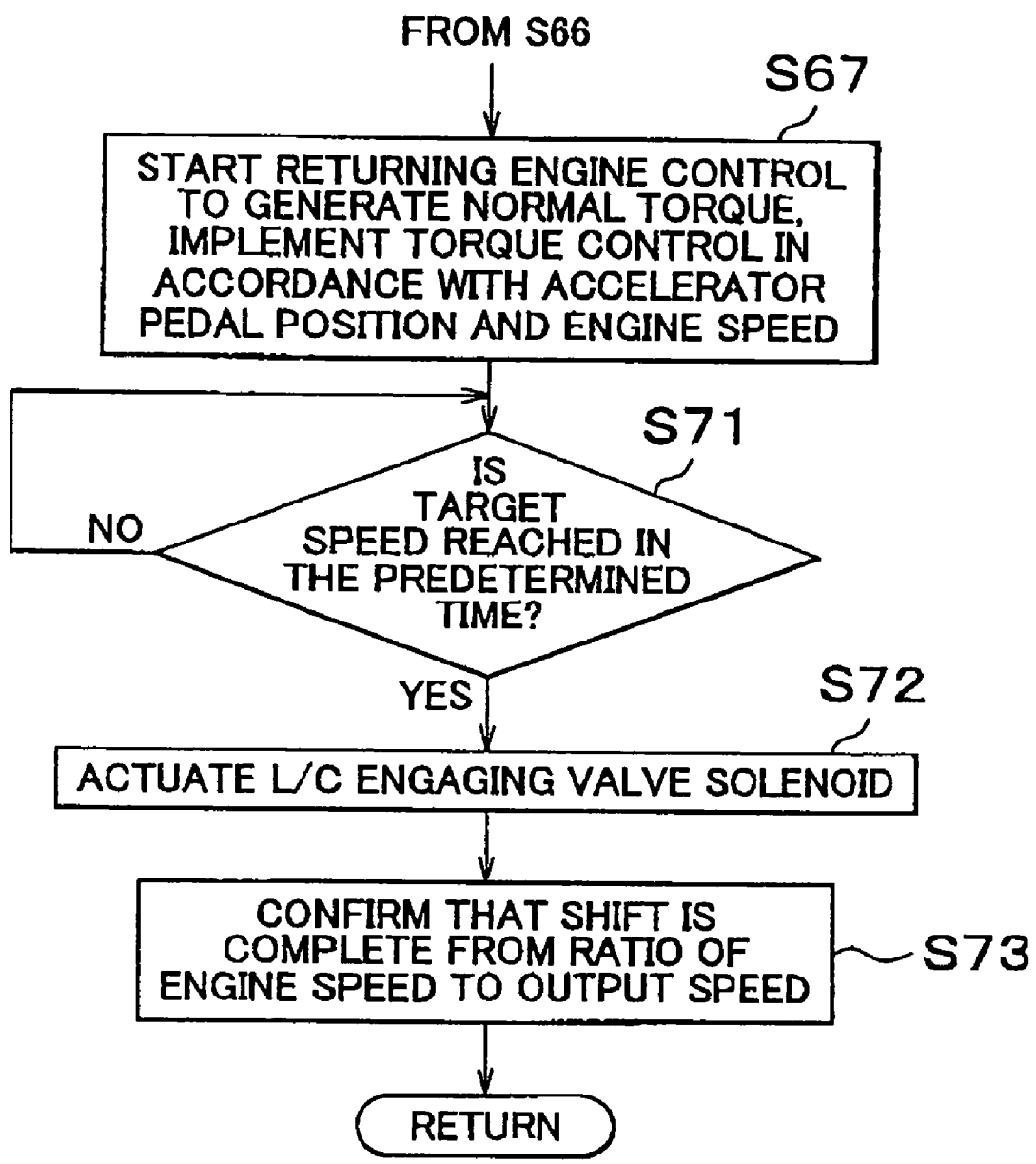
FIG. 9 is still another part of the flowchart shown in FIG. 7.

FIGS. 7 through 9 are flowcharts for explaining a control example in which the frictional engaging device absorbs the inertia torque by engaging. First the vehicle speed is determined. That is, the accelerator pedal position and vehicle speed are detected (Step S51), the gear speed is confirmed using a shift map (Step S52), and a determination of whether the shift conditions are met is made (Step S53), just as in Steps S1 through S3 in the first control example, or Steps S31 through S33 in the second control example. When the shift conditions are met such that the determination in Step S53 is YES a shift signal is output and an engine target speed (target speed to be achieved) of the gear change ratio on the high gear speed side is calculated (Step S54). Step S54 is just like Step S4 in the first control example or Step S34 in the second control example.

Then a lockup clutch (L/C) in the torque converter 16 with a lockup clutch is released (Step S55). The engine 1 and the automatic transmission 15 are able to rotate relative to one another in order to reduce or prevent shock and vibration. Further, control is performed to release the frictional engaging device (e.g., a brake) that is establishing the low speed gear speed, which is a gear speed before shifting (Step S56). More specifically, a solenoid valve, not shown, for that brake is operated so as to release the brake. This control continues until the brake hydraulic pressure drops to a predetermined hydraulic pressure (or until a predetermined amount of time has passed).

When the hydraulic pressure drops or the predetermined amount of time has passed such that the determination in Step S57 is YES, a frictional engaging device (clutch) 17 for establishing a high gear speed, which is a gear speed after shifting, is activated in the direction of engagement (Step S58). More specifically, a solenoid valve, not shown, for the clutch 17 is actuated so as to engage the clutch 17. Engaging force (i.e., hydraulic force) of the clutch 17 is increased to a torque estimated value which corresponds to a torque generation control signal of the engine 1 (Step S59). This control continues until the clutch hydraulic pressure of the clutch 17 rises to a predetermined hydraulic pressure (or until a predetermined amount of time has passed).

When that hydraulic pressure rises or the predetermined amount of time passes such that the determination in Step S60 is YES, it is determined whether this shift is a shift in the power on state (Step S61). That is, when the clutch 17 on the high gear speed side after shifting has a certain amount of engaging force, the torque phase inside the automatic transmission 15 ends, after which the inertia phase that changes the speed of rotating members (a gear of the low speed gear side) of the automatic transmission 15 begins. It is then determined whether that inertia phase is being generated while the torque input to the automatic transmission 15 is increasing or while it is decreasing. Herein, the torque phase refers to a state where a frictional engaging device on a low speed gear side is not slipping and a fictional engaging device on a high speed gear side is slipping.

When the determination in Step S61 is NO because of the power off state (i.e., a state where the accelerator pedal is not depressed), it is next determined whether the engine speed NE has reached a target speed that is a speed in accordance with the gear change ratio after shifting (Step S62). An upshift is a shift to reduce the engine speed NE, while the power off state is an output state to reduce the engine speed NE. Therefore, by engaging the clutch 17 on the high gear speed side, the engine speed NE is automatically reduced. It is therefore determined whether the engine speed NE after being reduced matches the target speed.

Accordingly, a predetermined solenoid valve, not shown, is actuated so as to engage the lockup clutch after the determination in Step S62 is YES (Step S63). It is then determined that the shift has ended (Step S64).

Conversely, when the determination in Step S61 is YES because there is an upshift during the power on state, it is necessary to reduce the engine speed NE while the requested output amount is increasing. Therefore, first, the target speed to be achieved of the high gear speed after shifting is calculated with consideration given to the slip amount of the torque converter 16 with a lockup clutch in a state in which the lockup clutch is released (i.e., in the OFF state) (Step S65). This is because the engine speed NE increases several percent of the slip rate of the torque converter 16 with a lockup clutch.

In the inertia phase, the engine speed NE is controlled so as to match that target speed. This is done by controlling the valve timing of the intake valve 3 and the exhaust valve 4, or controlling the ignition timing in addition to controlling the valve timing. It is determined whether the engine speed NE is maintaining a target value as a result of this control (Step S66). This target value is a transitional target value in the inertia phase, and is preset as a mode for a preferable change of the engine speed NE.

When the determination in Step S66 is YES, control for returning the engine torque control to normal control begins (Step S67). That is, torque control according to the driving state of the vehicle, such as according to the accelerator pedal position and the vehicle speed, is performed. Accordingly, the valve timing of the intake valve 3 and the exhaust valve 4 returns to the timing shown in FIG. 20A or FIG. 20B.

Conversely, when the determination in Step S66 is NO due to the fact that the engine speed NE is off from the target value, it is determined whether the engine speed NE is faster than the target speed NE0, i.e., whether the engine speed NE is off to the high speed side (Step S68). When the determination in Step S68 is YES, engine speed control is performed to reduce the engine speed NE (Step S69). This can be done, for example, by changing the control gain of the engine speed control or selecting the control pattern of the valve timing of the intake valve 3 and the exhaust valve 4.

Also, when the determination in Step S68 is NO due to the fact that the engine speed NE is slower than the target speed target speed NE0, engine speed control is performed to increase the engine speed NE (Step S70). This can also be done, for example, by changing the control gain of the engine speed control or selecting the control pattern of the valve timing of the intake valve 3 and the exhaust valve 4.

When the engine speed NE matches the target value such that the determination in Step S66 is. YES, the control starts to return to normal control of the engine torque in Step S67. In this case, it is determined whether the engine speed NE has reached the target value before a predetermined amount of time before the point at which the engine speed NE reaches the target speed according to the gear change ratio after shifting i.e., the inertia phase ends (Step S71).

When the determination in Step S71 is YES, the lockup clutch engages (Step S72). That is when the determination in Step S71 is YES, the inertia phase ends immediately after. Together with this, a solenoid valve for engaging the lockup clutch is actuated to engage the lockup clutch. It is then determined that the shift has ended based on the ratio of the engine speed NE to an output shaft speed (Step S73).

Figure 10:
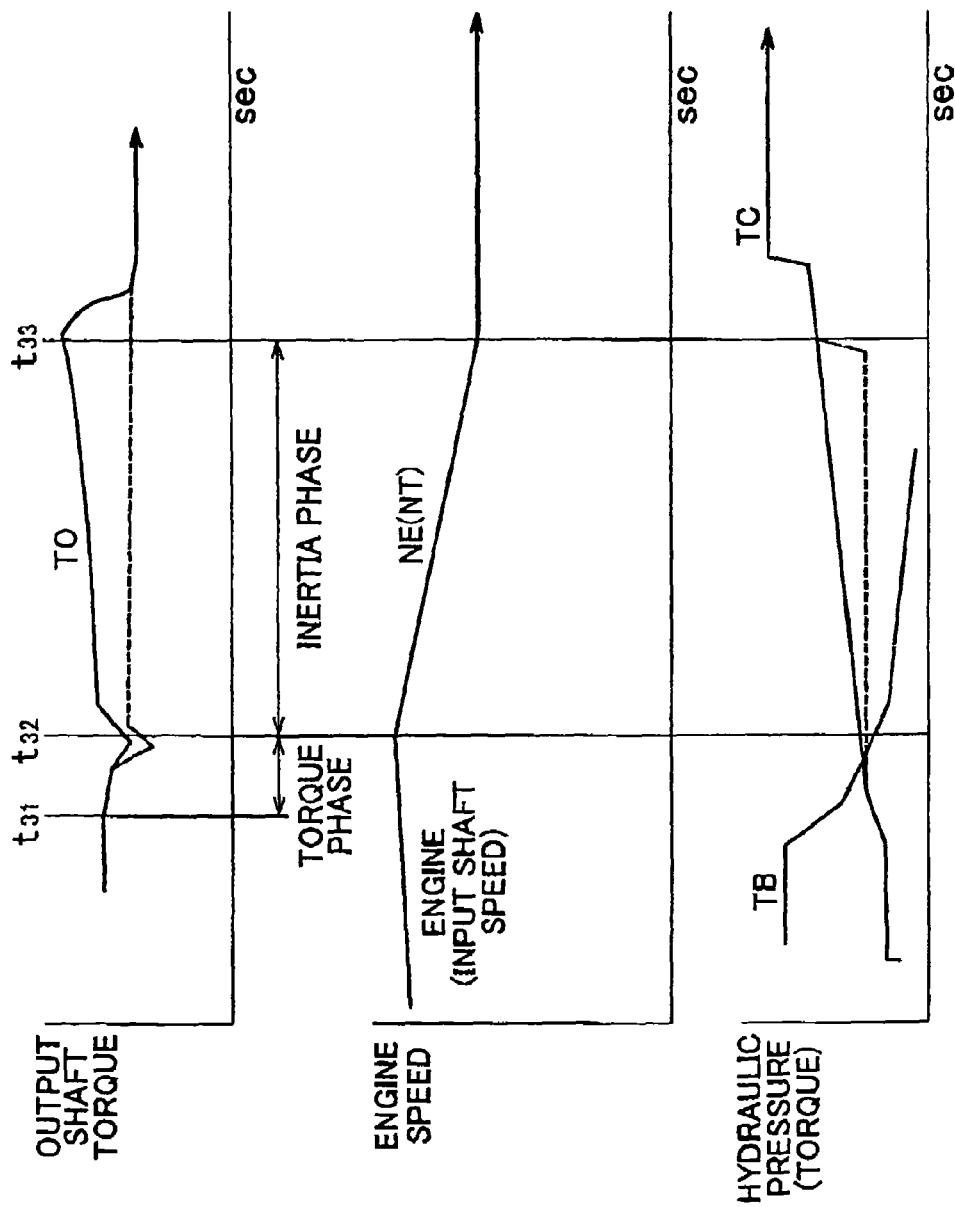
FIG. 10 shows a typical change in engine speed when the control shown in FIGS. 7 through 9 is implemented.

The solid line in FIG. 10 shows the change in an output shaft torque TO, the engine speed NE, and the torque capacity TC when the control in FIG. 7 through clutch 9 is performed. When the shift conditions are met, a brake hydraulic pressure TB of the brake which the friction engaging device on the low speed gear speed drops and the torque capacity TC of the clutch which the friction engaging device on the high gear speed side rises. As a result, the torque phase begins at time t31. Then after the torque capacity TC of the clutch on the high gear speed side has increased to a certain level, the inertia phase begins at time t32.

In this case, the engine speed NE is controlled by controlling the valve timing so as to match the target value of the inertia phase. As a result, the engine speed NE changes smoothly to the target speed after shifting. Also, the torque capacity TC is maintained at a hydraulic pressure according to the engine torque thus maintaining a predetermined output shaft torque TO. The engine speed NE then reaches the target speed, which is the speed after shifting, at time t33 and the inertia phase ends. Then the torque capacity TC is increased so as to reliably maintain the high gear speed after shifting.

Therefore, according to the foregoing shift control, the engine speed NE is changed to the target speed after shifting by reducing (suppressing) the engine torque by controlling the valve timing. Shifting then progresses in the automatic transmission 15 by making the engaging force of the clutch 17 of the high gear speed side a capacity in accordance with the engine torque in that state. Therefore, the torque acting on the clutch 17 that performs the shift decreases by the amount of inertia generated inertia torque, which is suppressed by the engine speed control by controlling the engine 1 itself. The torque capacity of the engaging device on the engaging side, such as the clutch 17, decreases so the engaging device is able to be reduced in size. In other words, the durability of the engaging device is able to be improved.

Figure 11:
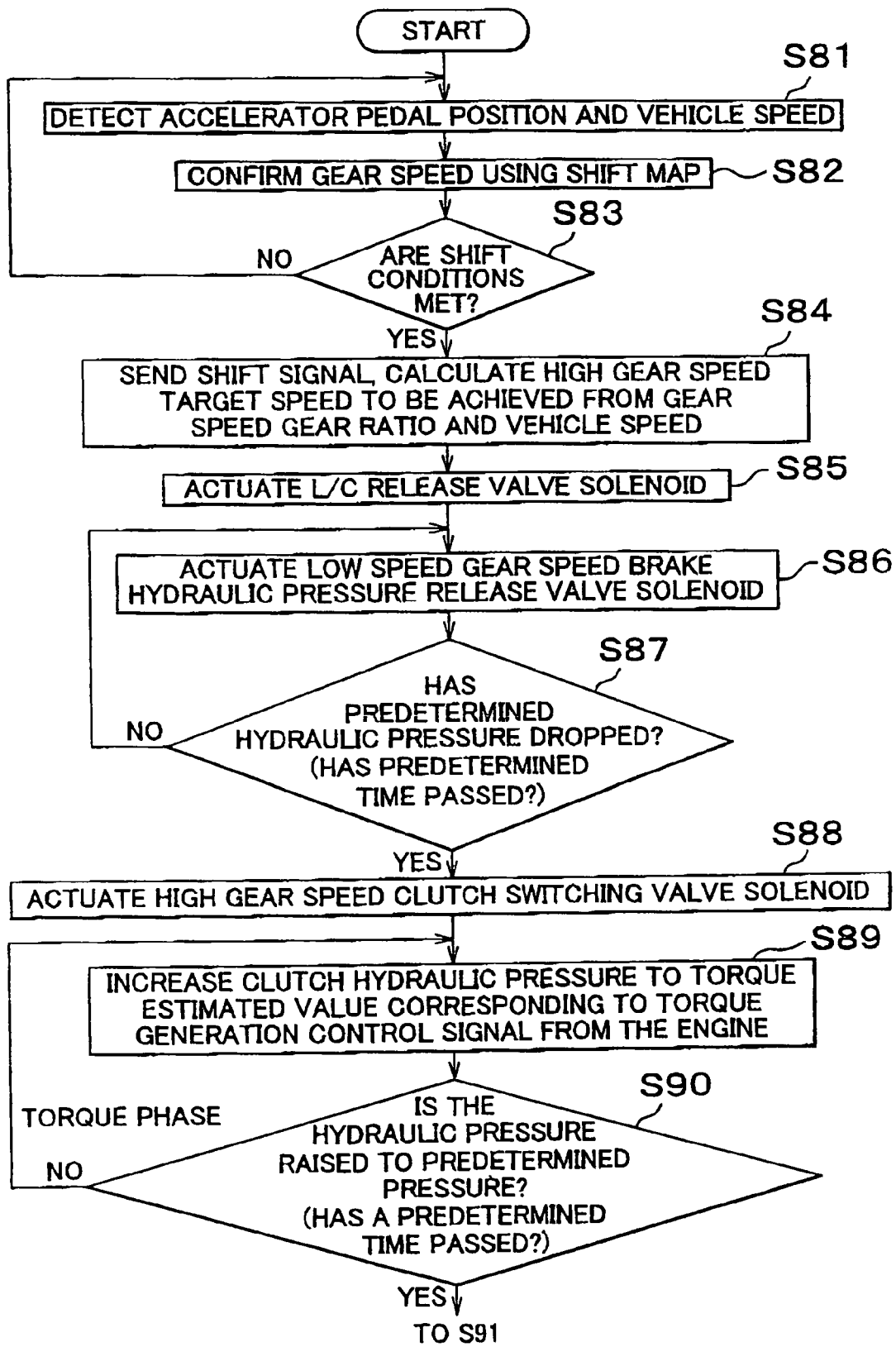
FIG. 11 is a part of a flowchart for explaining a control example according to a fourth exemplary embodiment of the invention.
Figure 12:
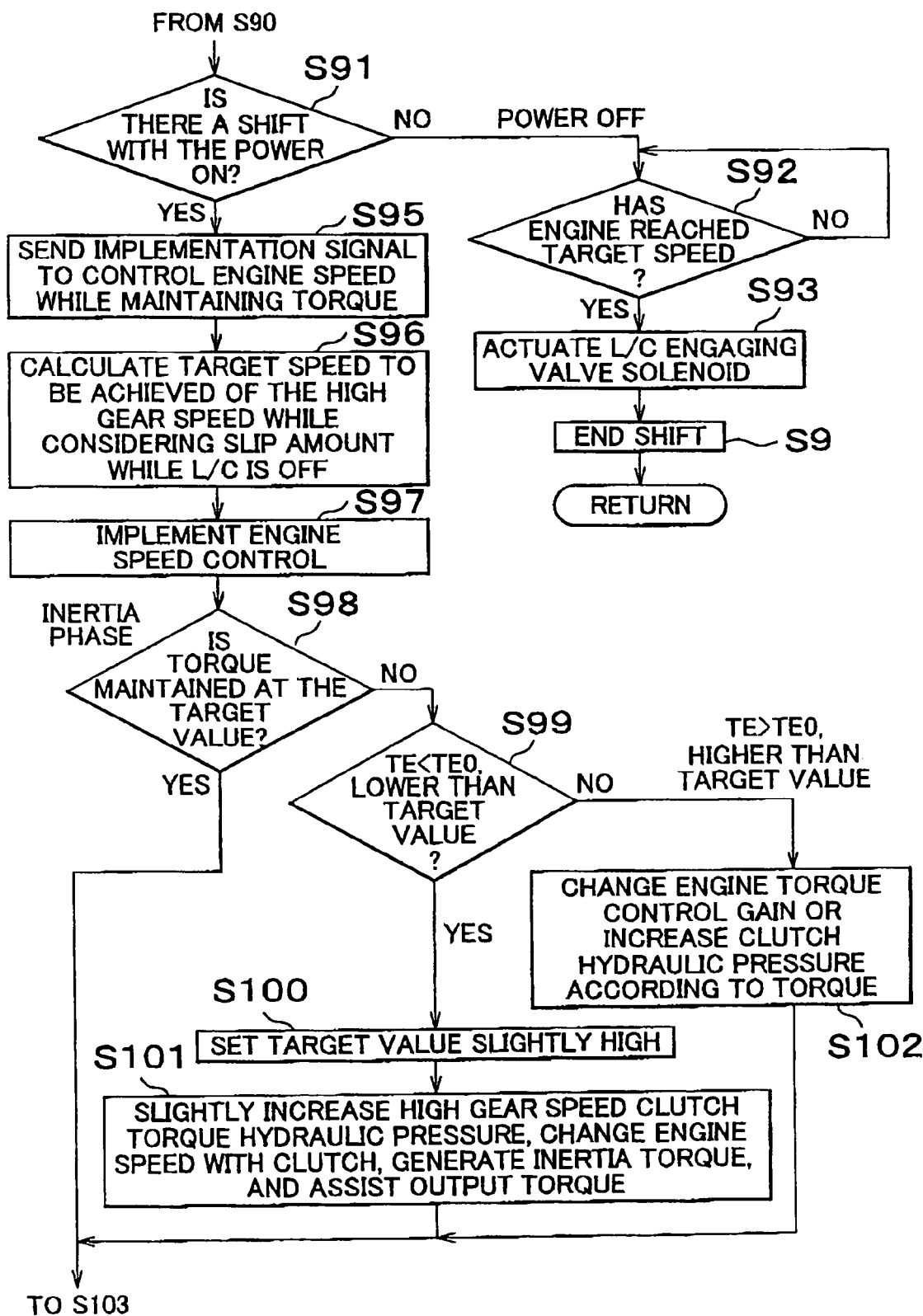
FIG. 12 is another part of a flowchart shown in FIG. 11.
Figure 13:
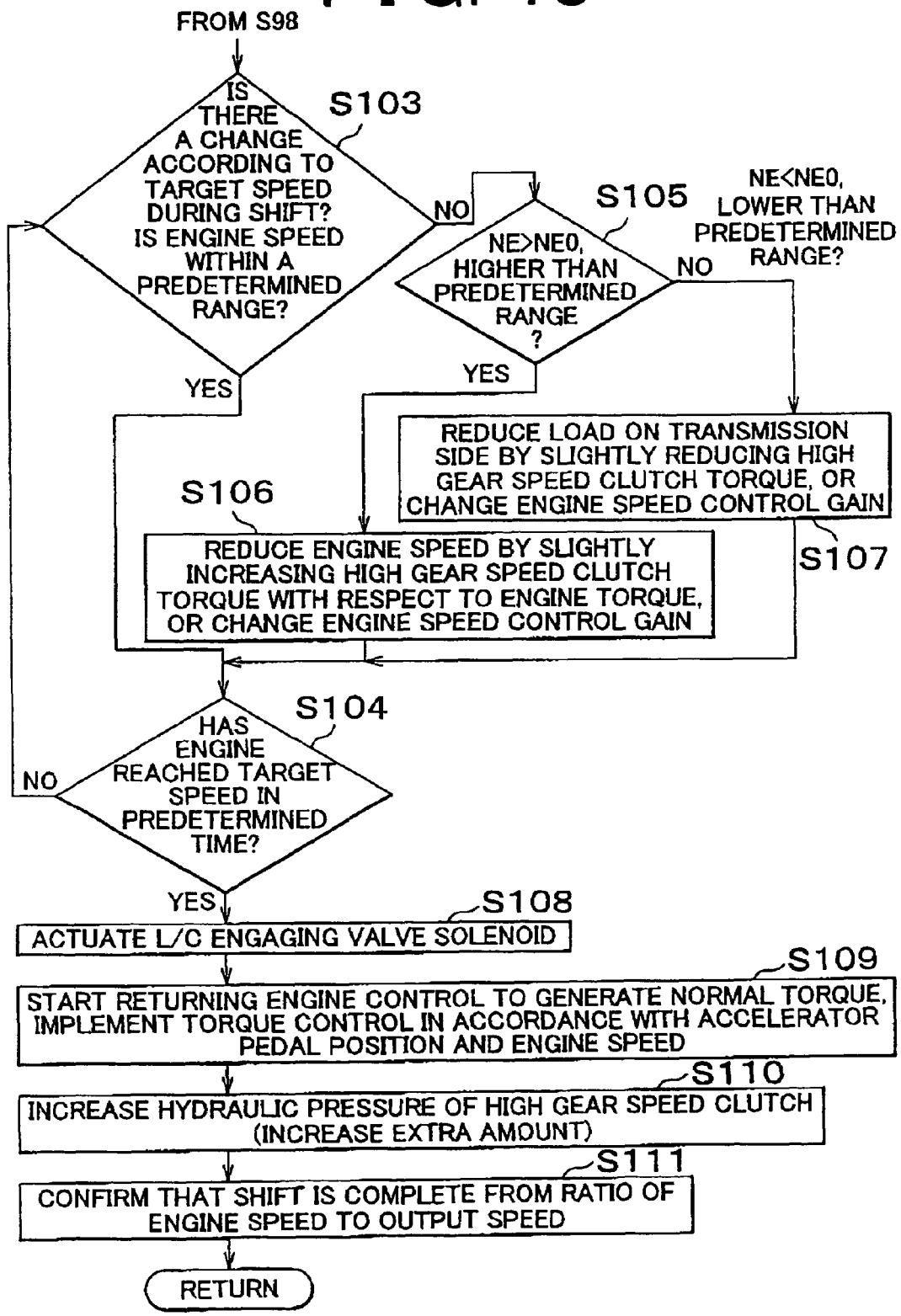
FIG. 13 is still another part of the flowchart shown in FIG. 11.

Next, as a fourth exemplary embodiment, a control example for generating a negative torque in order to change the engine speed by controlling the engine 1 itself such that the frictional engaging device on the engaging side maintains a torque capacity that is equivalent to static torque (a torque which acts on a friction engaging device when a shift is being not performed) will be described. FIGS. 11 through 13 are flowcharts for explaining this control example, in which the control from when the shift conditions are met until the torque phase has ended is performed in the same manner as in the control example in FIGS. 7 through 9 above.

That is, detecting the accelerator pedal position and the vehicle speed (Step S81), confirming the gear speed using a shift map based on those detections (Step 582), determining whether the shift conditions have been met (Step S83), sending a shift signal and calculating the target speed to be achieved of the high gear speed (Step S84), performing control to release the lockup clutch (Step S85), performing control to release the brake that is establishing the low speed gear speed (Step S86), confirming that released state (Step S87), performing control to engage the clutch on the high gear speed side (Step S88), performing control to increase that clutch hydraulic pressure (Step S89), and confirming an increase in that hydraulic pressure (Step S90), are each performed in the same manner as Steps S51 through Steps 60 in the third control example shown in FIGS. 7 through 9.

The clutch hydraulic pressure in the control example described here is a hydraulic pressure that is equivalent to a static torque in the frictional engaging device of the high gear speed, or a hydraulic pressure in which a hydraulic pressure equivalent to a predetermined amount from an inertia torque at the time of the shift is added to the hydraulic pressure that is equivalent to a static torque in the frictional engaging device of the high gear speed. Accordingly, the clutch hydraulic pressure becomes lower than the hydraulic pressure of the inertia phase in the control example in FIGS. 7 through 9.

Next, it is determined whether this shift is being performed during the power on state (Step S91). When the determination in Step S91 is NO, i.e., when there is an upshift during the power off state, the engine speed NE will automatically drop. Therefore, just as with the control example shown in FIGS. 7 through 9, it is determined whether the engine speed NE has reached the target speed after shifting (Step S92). Then a predetermined solenoid valve, not shown, is actuated so as to engage the lockup clutch (Step S93), and it is determined that the shift has ended (Step S94).

Conversely, when there is an upshift during the power on state such that the determination in Step S91 is YES, a control implementation signal is output for controlling the engine speed NE while the engine torque is maintained (Step S95). More specifically, this engine control is control for changing the speed by setting the valve timing of the intake valve 3 and the exhaust valve 4 as shown in FIG. 20C or FIG. 20D. Further, the target speed to be achieved of the high gear speed after shifting is then calculated taking the slip amount of the torque converter 16 with a lockup clutch while the lockup clutch is released (i.e., in the OFF state) into consideration (Step S96). This control is just like that in Step 65 in the third control example.

The engine speed NE is then controlled to the target speed obtained in the manner described above (Step S97). In this case, it is first determined whether an engine torque TE is maintained at a target value TEO during shifting (Step S98). When the engine torque TE is off from the target value TEO such that the determination in Step S98 is NO, it is determined whether the engine torque TE is less than the target value TEO (Step S99).

When the determination in Step S99 is YES, correction is performed to increase the target value TEO during shifting a predetermined amount (Step S100). Also, the hydraulic pressure of the clutch 17 that achieves the high gear speed is increased a predetermined amount such that the clutch 17 generates a change in the engine speed. The inertia torque that is generated following that change in engine speed assists the output shaft torque (Step S101).

Conversely, when the determination in Step S99 is NO due to the fact that the engine torque TE is higher than the target value TEO, the control gain is changed so as to reduce the engine torque, and the clutch hydraulic pressure is increased so that it corresponds to the engine torque (Step S102).

It is then determined whether the engine speed NE from performing the control described above is changing along the target speed during shifting, or whether the difference between the engine speed NE and the target speed during shifting is within a predetermined range (Step S103). When the determination in Step S103 is YES, it is next determined whether the engine speed NE has reached the target speed of the high gear speed after shifting before a predetermined time before the point at which it reaches the target speed (Step S104).

Conversely, when the determination in Step S103 is NO due to the fact that the engine speed NE in the inertia phase is far off from the target speed during shifting, it is then determined whether the engine speed NE is faster than a target range (target speed during shifting) NE0 (Step S105). When the determination in Step S105 is YES, the engine speed NE is reduced by increasing the torque capacity (engaging force) of the clutch 17 on the high gear speed side a predetermined amount with respect to the engine torque. At the same time, the control gain of the engine speed NE is also changed (Step S106).

Conversely, when the determination in Step S105 is NO, i.e., when the engine speed NE is lower than the target range (target speed during shifting) NE0, the hydraulic pressure (engaging force) of the clutch 17 on the high gear speed side is reduced slightly. As a result, a negative load on the output side of the engine 1 is reduced such that the engine speed NE increases. At the same time, the control gain of the engine speed NE is also changed (Step S107).

When the shift progresses by the implementation of the control described above and reaches a state immediately before the inertia phase ends such that the determination in Step S104 is YES, the inertia phase ends immediately thereafter. Therefore, after that, in order to engage the lockup clutch, a solenoid valve for engaging the lockup clutch is actuated (Step S108). This control is the same as that in Step S72 in the third control example described above.

Next, control for returning the engine torque control to normal control is started (Step S109). This control is the same as that of Step S67 in the third control example described above. In order to reliably establish the high gear speed after shifting, the hydraulic pressure of the clutch 17 is increased an extra amount of the torque capacity of the clutch 17 (Step S110). It is then determined whether the shift is over based on the ratio of the engine speed NE to the output shaft speed (Step S111). This control is the same as that of Step S73 in the third control example described above.

The change in the output shaft torque TO and the torque capacity TC when the control shown in FIGS. 11 through 13 is implemented is shown by the broken like in FIG. 10. The torque capacity TC is maintained at a low pressure equivalent to the static torque by absorbing the change in an engine speed of the inertia phase and the inertia torque at follows by changing the engine speed by controlling the engine speed and torque of the engine 1 with the valve timing. That is, because the torque capacity of the clutch for establishing the high gear speed can be low, the clutch is able to be reduced in size, or the durability of the clutch can be improved.

The engine 1 is able to increase and decrease the output torque by controlling the valve timing of the intake valve 3 and the exhaust valve 4, which in turn enables the engine speed NE to be changed. Therefore, valve timing control can also be used for control other than speed control during shifting. An example of this is described below.

Figure 14:
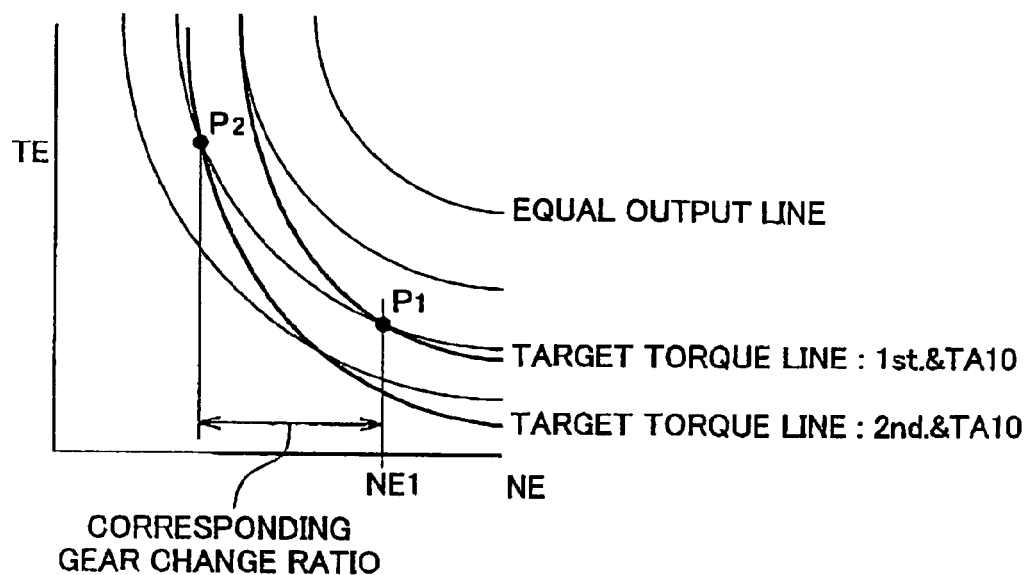
FIG. 14 shows an example of a driving point when control has been implemented to make the acceleration feeling the same before and after shifting.

For example, valve control can be used to control the acceleration feel so that it remains the same before and after shifting. FIG. 14 shows equal output lines and target torque lines and uses engine speed NE and engine torque TE as parameters to explain that control. The target torque lines are lines in which the torque is set preferably according to the gear speed and the accelerator pedal position. The target torque lines are set properly for the vehicle characteristics and use and the like.

For example, when an upshift from a first speed to a second speed is performed when the accelerator pedal position is TA10 and the engine speed is NE1, the driving state in first speed is expressed by point P1 in FIG. 14. Because the shift is completed in a short amount of time, there is almost no change in the engine output before and after the shift. Therefore, the driving state at the point at which second speed is achieved after shifting is expressed as point P1 on the equal output line.

Conversely, the target torque line of second speed when the accelerator pedal position is TA10 is set on the low torque side and generally parallel to the target torque line of the first speed. If a point of intersection P2 of the target torque line for the second speed and the equal output line is made the driving point when second speed is achieved, the engine output before and after shifting is able to be kept constant such that the acceleration feel does not change.

In the engine 1, if there is room in the control for increasing and decreasing the torque, the torque can be reduced by valve timing control while the engine speed NE is reduced following an upshift to second speed. Accordingly, by controlling the engine 1 to a driving state expressed by point P2 shown in FIG. 14, it is possible to make the acceleration feel before and after shifting the same, and therefore improve drivability.

Figure 15:
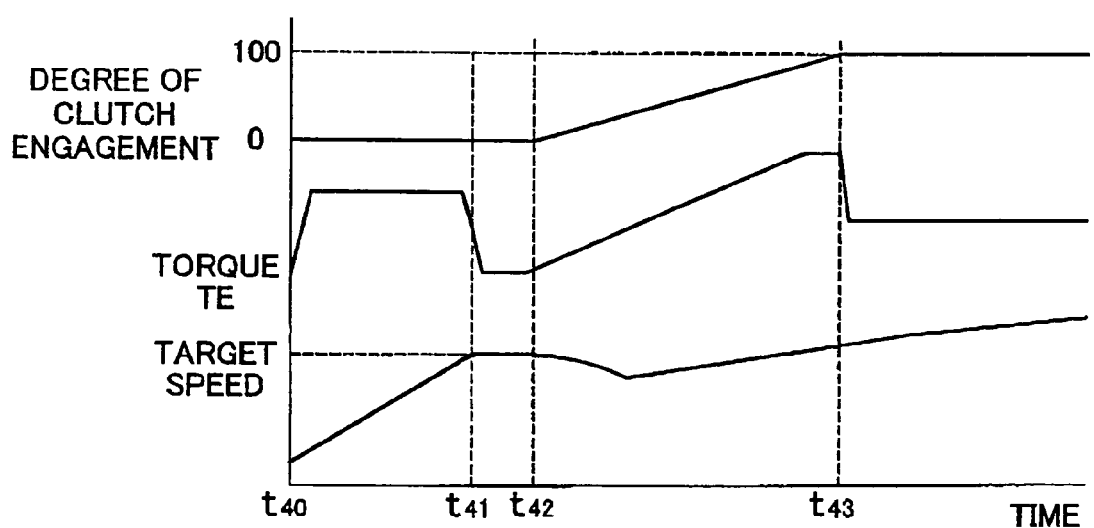
FIG. 15 is a flowchart for explaining a control example for engine speed and engine torque when engaging a take off clutch.

Also, in a vehicle that takes off by engaging a so-called take off clutch, it is also possible to use the control of the invention in order to prevent a drastic increase or drop in engine speed when the take-off clutch is engaged. FIG. 15 shows an example of this control.

At time t40 when take-off of the vehicle is determined, first the engine torque TE is increased and the engine speed NE is rapidly increased to a target speed for take-off. This control can be performed by changing the valve timing. It may also be performed by increasing the throttle opening or the fuel injection quantity and the like, along with changing the valve timing.

The target speed is reached at time t41 and this state is maintained until time t42. During that time, because the speed just needs to be maintained, the engine torque can be reduced. Then, the take-off clutch starts to engage at time t42 such that the load of the transmission side is applied to the engine 1. This load of the transmission side acts to reduce the engine speed NE, so to compensate, the valve timing is controlled to increase the engine torque TE. In this case, the load on the transmission side increases as the take-off clutch engages to a larger degree, so the engine torque TE is controlled to increase according to the degree of engagement of the take-off clutch. Moreover, if the engine torque TE becomes relatively large such that there is a tendency for the engine speed to abruptly increase, the engine torque TE is reduced. From time t43 on, in which the take-off clutch is fully engaged, the engine 1 is controlled so that the engine torque TE necessary for acceleration after take-off is obtained.

In this way, by controlling the engine torque TE according to the engagement of the take-off clutch, take-off is able to be made smooth without the engine stalling or the engine speed abruptly increasing.

Figure 16:
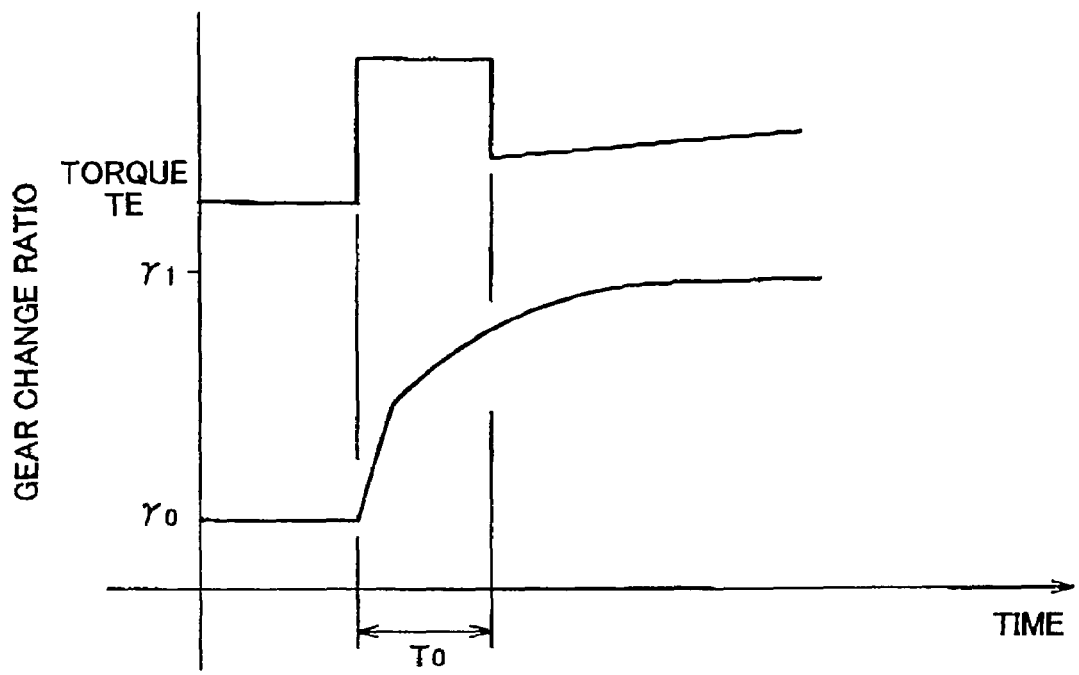
FIG. 16 shows the timing for implementing torque increase control during a shift of a continuously variable transmission.

Further, in a vehicle having a continuously variable transmission, the gear change ratio is changed by, for example, a first order lag, with respect to the target gear change ratio. This is done to minimize shock and so that the inertia torque does not become excessively large. The delay in the change of the gear change ratio when accelerating, therefore, is one reason that the feeling of acceleration is lost. In this case, the valve timing of the engine 1 is controlled during the initial period of the shift to temporarily increase the engine torque TE A typical illustration of this is shown in FIG. 16. When the gear change ratio is increased from γ0 to γ1, the engine torque TE is increased from the start of the shift for a predetermined period of time T0.

Performing this kind of control results in good control response of the engine torque TE, thereby compensating for the delay in the change in the gear change ratio and increasing the output shaft torque. As a result, the acceleration feel of the vehicle improves.

The upshift of the invention includes a shift from neutral state to driving range, e.g., first gear speed. That is, the upshift includes takeoff of a vehicle.

This invention is not limited to the specific examples described above. A single driving mechanism for driving the intake valve or the exhaust valve can be provided for the intake exhaust valves, or for just one, or a plurality of valves and the plurality of valves can be driven together. Further, when increasing the intake air quantity, the time that the valves are open or closed can be increased, or the lift amount (the open area of the intake port) of the intake valve, in addition to the time that the valves are open or closed, can be increased.

As in the aforementioned exemplary embodiment, the inertia torque that is absorbed by the transmission when the intake air amount control is not performed in the inertia phase may be reduced by performing the intake air amount control in the inertia phase. When all of the inertia torque absorbed by the transmission when the intake air amount control is not performed is absorbed by the intake air amount control, the control width of the clutch hydraulic pressure of the transmission in the inertia phase may be set to 0. That is, in the inertia phase, it is possible to engage the clutch of the transmission by an hydraulic pressure corresponding to the static torque, without having to control the clutch hydraulic pressure in order to absorb the inertia torque.

The invention claimed is:

1. A control device for an engine and a transmission, comprising:
    a driving mechanism that controls at least one of an intake valve and an exhaust valve so as to be opened and be closed without a torque from an output shaft of the engine;
    a transmitting mechanism provided between the transmission and the engine; and
    a controller that reduces or interrupts a torque transmitted by the transmitting mechanism during an upshift, performing a rotation reduction control for controlling the driving mechanism so as to reduce an engine speed while the torque transmitted by the transmitting mechanism is reduced or interrupted, and controls, when the engine speed becomes a target engine speed that is higher than a first engine speed according to the gear ratio after the upshift, the driving mechanism so that the engine speed becomes the first engine speed according to the gear ratio after the upshift while increasing the torque transmitted by the transmitting mechanism during the upshift.

2. The control device according to claim 1, wherein, when increasing the torque transmitted by the transmitting mechanism, the controller increases the rate at which the torque transmitted by the transmitting mechanism is increased as the difference between the actual engine speed and the target engine speed decreases, and decreases the rate at which the torque transmitted by the transmitting mechanism is increased as the difference between the actual engine speed and the target engine speed increases.

3. The control device according to claim 1, wherein:
an inertia torque generated by the shift is absorbed by the rotation reduction control and clutch hydraulic pressure control on the transmission side during an inertia phase while shifting.

4. The control device according to claim 3, wherein:
a control width of the clutch hydraulic control necessary to absorb the inertia torque in the inertia phase is reduced by the rotation reduction control.

5. The control device according to claim 1, wherein:
an amount of inertia torque absorbed by clutch hydraulic control on the transmission side is reduced by absorbing the inertia torque on the engine side by the rotation reduction control during the inertia phase while shifting.

6. The control device according to claim 5, wherein:
a control width of the clutch hydraulic control necessary to absorb the inertia torque in the inertia phase is reduced by the rotation reduction control.

7. The control device according to claim 5, wherein:
a control width of the clutch hydraulic control to absorb the inertia torque in the inertia phase is set to 0 by the rotation reduction control.

8. The control device according to claim 1, wherein:
all of the inertia torque is absorbed by the rotation reduction control during the inertia phase while shifting.

9. The control device according to claim 8, wherein:
a control width of the clutch hydraulic control to absorb the inertia torque in the inertia phase is set to 0 by the rotation reduction control.

10. The control device according to claim 1, further comprising:
a torque transmitting device that reduces the torque from the engine while that a torque is being transmitted to the output shaft of the transmission,
wherein, the controller controls the torque transmitting device so as to reduce the torque transmitted from the engine to the output shaft of the transmission during a shift of the transmission, and performs the rotation reduction control, and controls the torque transmitting device so as to increase the torque transmitted to the output shaft of the transmission after the engine speed has been synchronized with the target speed after shifting by the rotation reduction control.

11. The control device according to claim 10, wherein:
the torque transmitting device is a transmitting mechanism that connects the engine with the transmission; and
the controller:
reduces a torque capacity of the transmitting mechanism during shifting,
executes the shift while the torque capacity of the transmitting mechanism is being reduced,
controls the engine speed to the target speed in accordance with the gear change ratio after shifting by performing the rotation reduction control while the torque which is transmitted from the engine to the transmission by the transmitting mechanism is being reduced, and
increases the torque transmitted from the engine to the transmission by the transmitting mechanism after the engine speed is synchronized with the target speed in accordance with the gear change ratio after shifting by the rotation reduction control.

12. The control device according to claim 11, wherein:
the transmitting mechanism includes a clutch mechanism that can be controlled to an engaged state for transmitting torque and a released state for interrupting torque, and
the controller selectively controls the clutch mechanism to the released state and the engaged state.

13. The control device according to claim 12, wherein:
the transmitting mechanism includes a clutch mechanism which can transmit the torque following mutual sliding of torque transmitting members, increase and decrease degree of the mutual sliding, and
the controller controls the degree of the mutual sliding by the clutch mechanism and controls the clutch mechanism so that the torque is transmitted without sliding.

14. The control device according to claim 10, wherein:
the torque transmitting device includes an engaging device on a high gear speed side within the transmission;
the shift is executed while the torque from the engine is input to the transmission; and
the controller progresses the upshift following an increase in an engaging force in the engaging device on the high gear speed side and corrects a difference between the engine speed in accordance with the engaged state of the engaging device in an inertia phase during the upshift and the target speed after shifting by the rotation reduction control.

15. The control device according to claim 10, wherein:
the torque transmitting device includes an engaging device on a high gear speed side within the transmission;
the shift is executed while the torque from the engine is input to the transmission;
an engaging force of the engaging device is set to a predetermined value at the time of the shift; and
the engine speed is controlled to the target speed after shifting by the rotation reduction control.

16. The control device according to claim 1, wherein:
the engine performs an intake stroke for drawing in air to a cylinder of the engine and an exhaust stroke for exhausting a combusted exhaust gas; and
the rotation reduction control includes at least one of suppressing discharge of the combusted exhaust gas on the exhaust stroke and drawing in the combusted exhaust gas again on the intake stroke, and
the controller reduces the engine speed by the rotation reduction control.

17. The control device according to claim 1, wherein:
the engine performs an intake stroke for drawing in air to a cylinder of the engine; and
the rotation reduction control includes controlling the intake valve so as to increase the amount of air taken into the engine, and
the controller increases the engine speed by the rotation reduction control.

18. The control device according to claim 1, wherein:
the driving mechanism includes an electromagnetic mechanism provided for the exhaust valve and the intake valve respectively, for electromagnetically opening and closing the exhaust valve and the intake valve individually.

19. A control method for an engine and a transmission comprising:

reducing or interrupting a torque transmitted by a transmitting mechanism provided between the engine and the transmission during an upshift;

controlling a driving mechanism, which controls at least one of an intake valve and an exhaust valve so as to be opened and be closed without a torque from an output shaft of the engine, so as to reduce an engine speed while the torque transmitted by the transmitting mechanism is reduced or interrupted; and controlling, when the engine speed becomes a target engine speed that is higher than a first engine speed according to the gear ratio after the upshift, the driving mechanism so that the engine speed becomes the first engine speed according to the gear ratio after the upshift while increasing the torque transmitted by the transmitting mechanism during the upshift.

* * * * *

UNITED STATES PATENT AND TRADEMARK OFFICE
CERTIFICATE OF CORRECTION

PATENT NO. : 7.048,671 B2
APPLICATION NO. : 10/489345
DATED : May 23, 2006
INVENTOR(S) : Kunio Morisawa et al.

It is certified that error appears in the above-identified patent and that said Letters Patent is hereby corrected as shown below:

On title page
Item (56), please change:

JP 403129165A *6/1991 ..... 447/109
To:
JP 03129165 A *6/1991 ..... 477/109

Signed and Sealed this

Twenty-ninth Day of August, 2006

JON W. DUDAS
*Director of the United States Patent and Trademark Office*